(12) United States Patent
Nishimura et al.

(10) Patent No.: US 11,211,189 B2
(45) Date of Patent: Dec. 28, 2021

(54) COIL DEVICE

(71) Applicant: IHI Corporation, Tokyo (JP)

(72) Inventors: Kenji Nishimura, Tokyo (JP); Kentaro Furiya, Tokyo (JP); Jun Araki, Tokyo (JP)

(73) Assignee: IHI CORPORATION, Tokyo (JP)

( * ) Notice: Subject to any disclaimer, the term of this patent is extended or adjusted under 35 U.S.C. 154(b) by 432 days.

(21) Appl. No.: 16/313,922

(22) PCT Filed: Jun. 9, 2017

(86) PCT No.: PCT/JP2017/021526
§ 371 (c)(1),
(2) Date: Dec. 28, 2018

(87) PCT Pub. No.: WO2018/008331
PCT Pub. Date: Jan. 11, 2018

(65) Prior Publication Data
US 2019/0252105 A1  Aug. 15, 2019

(30) Foreign Application Priority Data
Jul. 7, 2016 (JP) .............................. JP2016-135128

(51) Int. Cl.
*H01F 27/02* (2006.01)
*H01F 38/14* (2006.01)
*H02J 50/10* (2016.01)
*B60L 53/12* (2019.01)
*H01F 27/28* (2006.01)
*H02J 7/00* (2006.01)

(52) U.S. Cl.
CPC .............. *H01F 27/02* (2013.01); *B60L 53/12* (2019.02); *H01F 27/28* (2013.01); *H01F 38/14* (2013.01); *H02J 7/00* (2013.01); *H02J 50/10* (2016.02)

(58) Field of Classification Search
CPC .......... H01F 27/02; H01F 27/28; H01F 38/14; H02J 7/00; H02J 50/10; B60L 53/12; Y02T 10/7072; Y02T 90/14; Y02T 10/70
See application file for complete search history.

(56) References Cited

U.S. PATENT DOCUMENTS

2008/0129246 A1   6/2008  Morita et al.
2009/0230163 A1   9/2009  Chang
2012/0218068 A1   8/2012  Yamakawa et al.
(Continued)

FOREIGN PATENT DOCUMENTS

CN   102651499 A   8/2012
JP   51-015053     4/1976
(Continued)

*Primary Examiner* — Jared Fureman
*Assistant Examiner* — Michael J Warmflash
(74) *Attorney, Agent, or Firm* — Volpe Koenig

(57) ABSTRACT

A coil device includes a coil portion including at least a coil, a housing including a base disposed on a side of a first surface of the coil portion and a cover disposed on a side of a second surface of the coil portion and accommodating the coil portion in an internal space formed by the base and the cover, and a fixing member fixing the cover to the base. The fixing member includes a first fixing portion disposed along at least the cover on a first outer periphery of the housing surrounding the base and the cover.

18 Claims, 18 Drawing Sheets

(56) References Cited

U.S. PATENT DOCUMENTS

| | | | |
|---|---|---|---|
| 2014/0327391 A1* | 11/2014 | Niederhauser | H01F 27/36 |
| | | | 320/108 |
| 2015/0061582 A1 | 3/2015 | Tatsuta et al. | |
| 2015/0364924 A1 | 12/2015 | Yuasa | |
| 2017/0076854 A1 | 3/2017 | Tokura et al. | |
| 2018/0025826 A1 | 1/2018 | Nishimura et al. | |

FOREIGN PATENT DOCUMENTS

| | | |
|---|---|---|
| JP | 55-044342 Y2 | 10/1980 |
| JP | 07-003125 U | 1/1995 |
| JP | 11-008142 A | 1/1999 |
| JP | 2008-087733 A | 4/2008 |
| JP | 2008-120239 A | 5/2008 |
| JP | 2011-050127 A | 3/2011 |
| JP | 2012-089618 A | 5/2012 |
| JP | 2014-075899 A | 4/2014 |
| JP | 2015-222751 A | 12/2015 |
| JP | 2016-001940 A | 1/2016 |
| JP | 2016-009687 A | 1/2016 |
| JP | 2016-010171 A | 1/2016 |
| JP | 2016-143773 A | 8/2016 |
| JP | 2016-526280 A | 9/2016 |
| WO | 2010/117139 A2 | 10/2010 |
| WO | 2013/145613 A1 | 10/2013 |
| WO | 2014/179320 A1 | 11/2014 |

\* cited by examiner

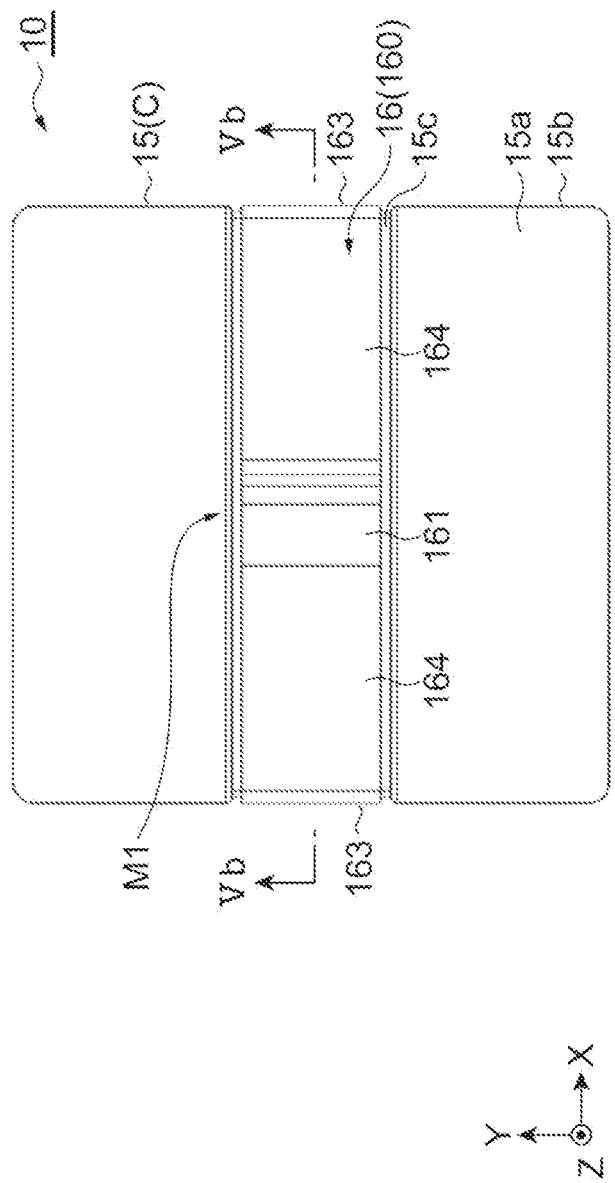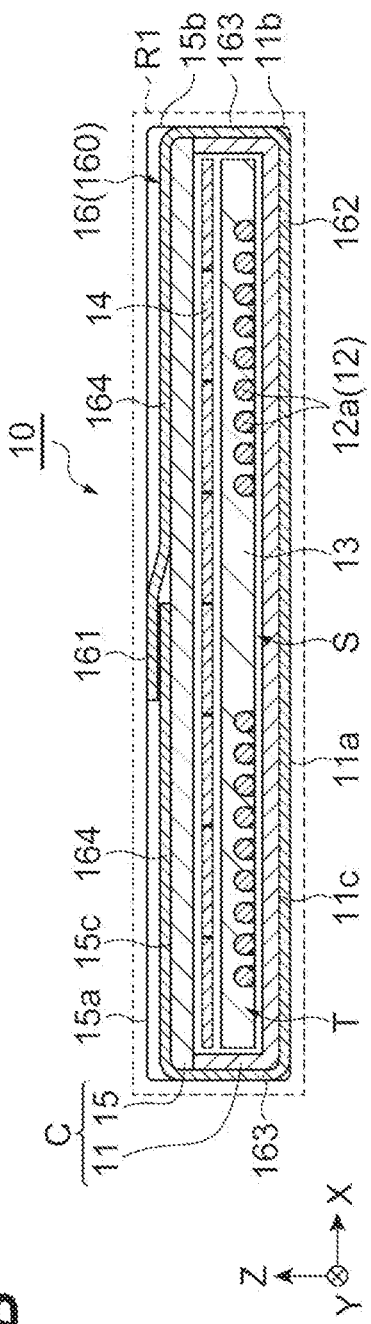
Fig.5A
Fig.5B

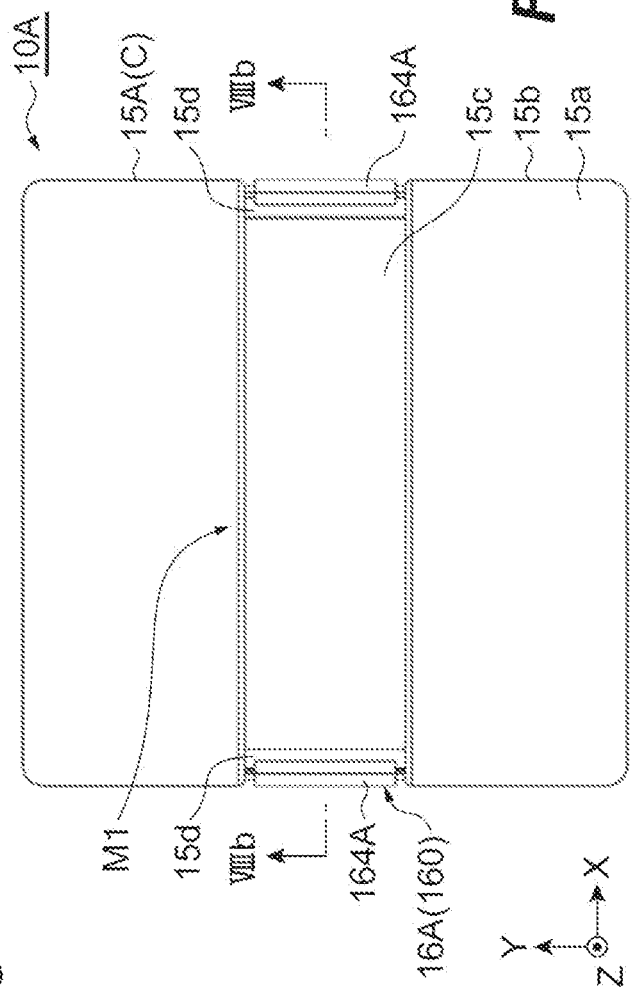
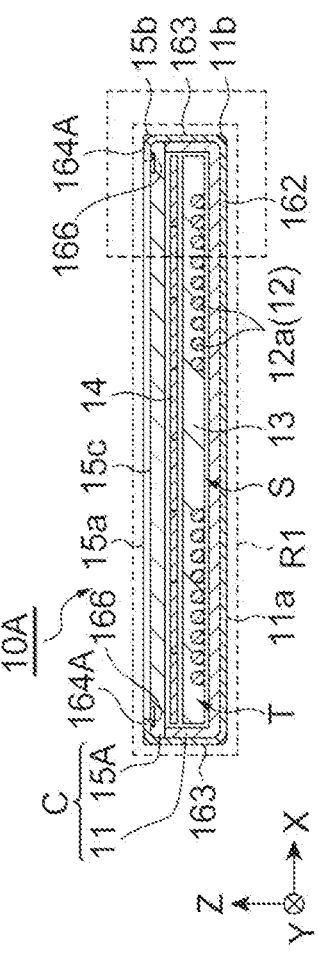
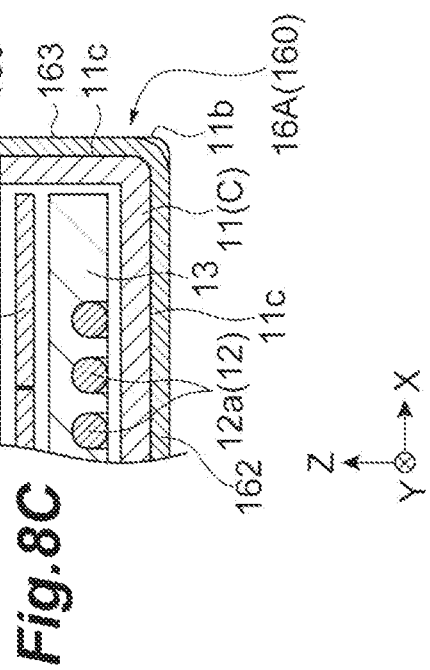
Fig. 8A
Fig. 8B
Fig. 8C

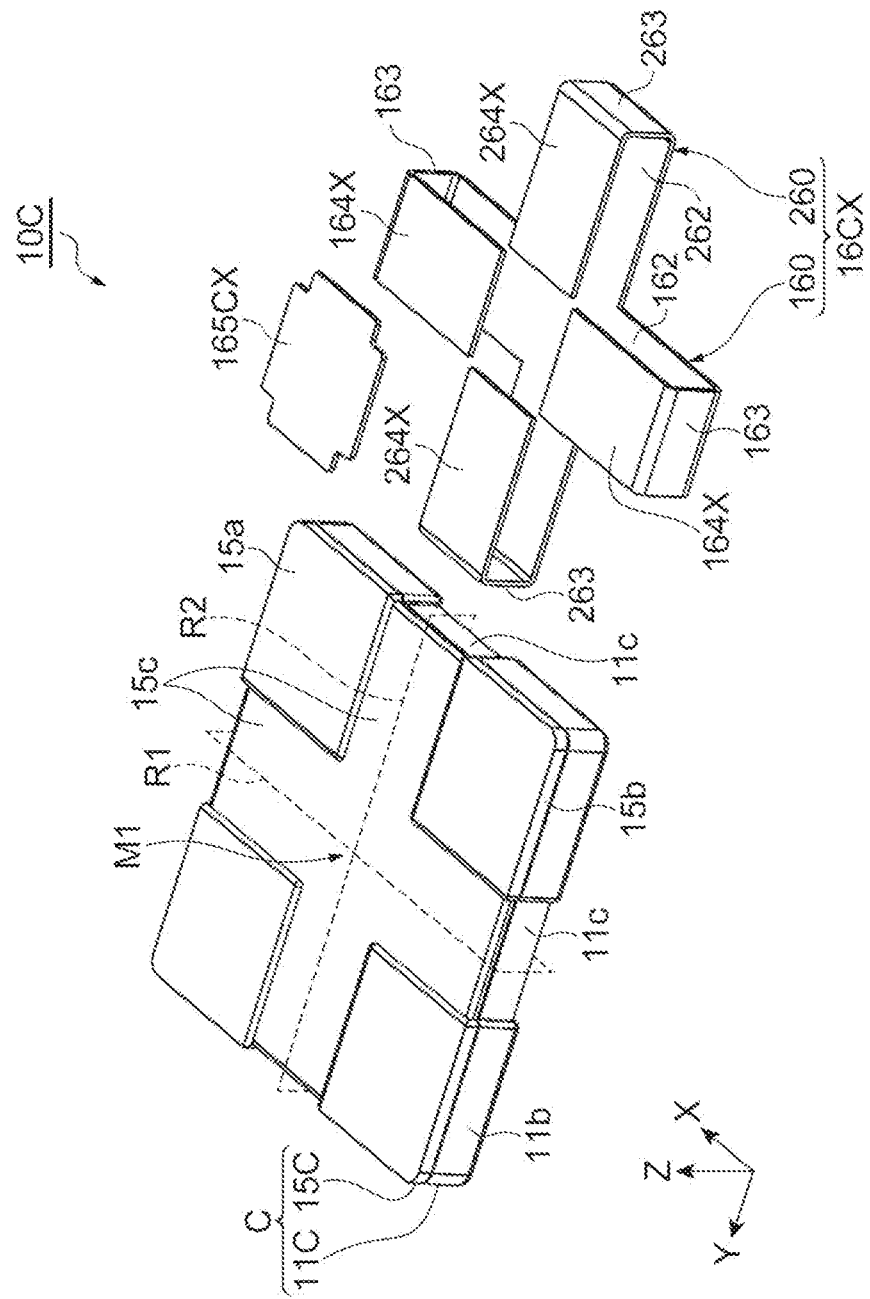

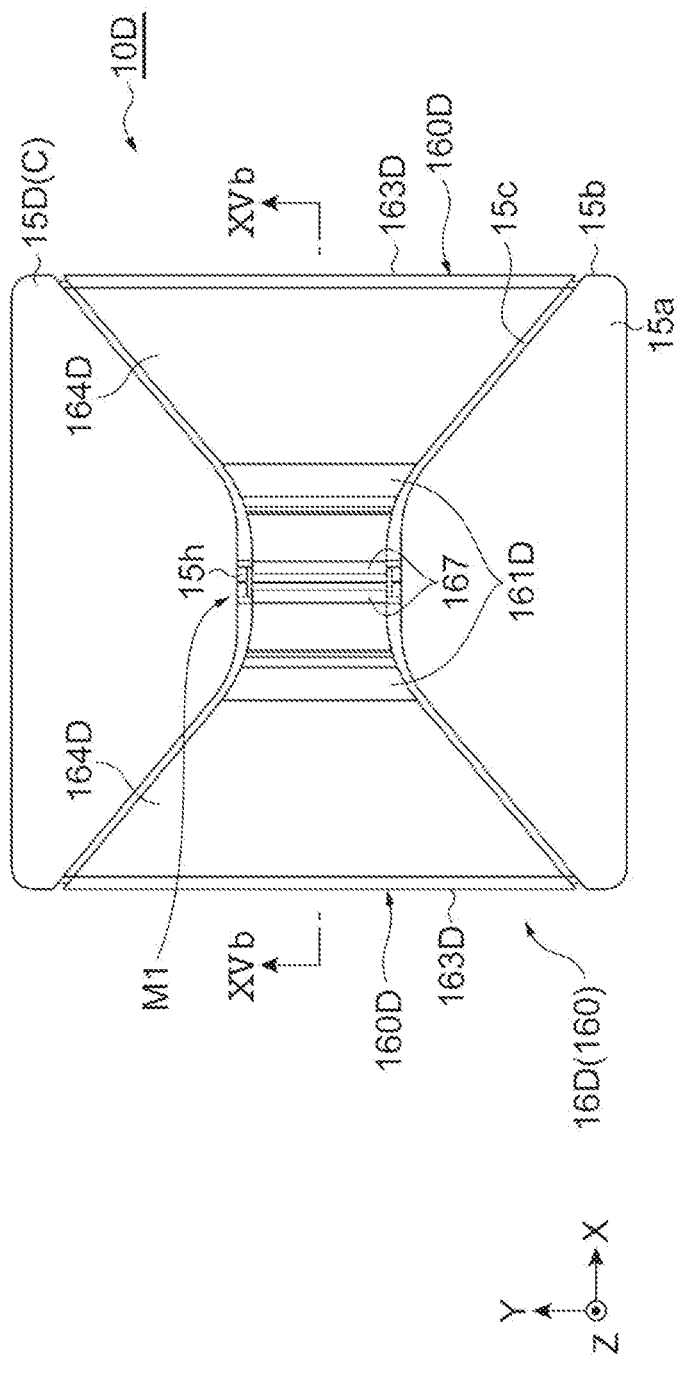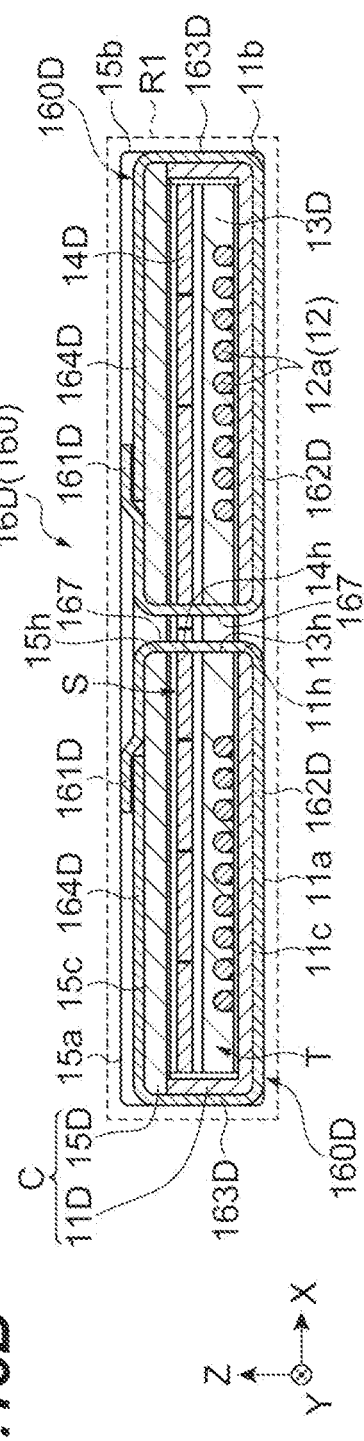

COIL DEVICE

TECHNICAL FIELD

The present disclosure relates to a coil device.

BACKGROUND ART

In the related art, a coil device provided with a coil portion including a coil and a housing including a base and a cover and accommodating the coil portion in an internal space formed by the base and the cover is known as a coil device used in a wireless power transfer system (see, for example, Patent Literature 1). In this coil device, the cover is provided with a spacer that has a rectangular parallelepiped shape and is capable of abutting against the base, and the cover is supported by the base via the spacer.

CITATION LIST

Patent Literature

Patent Literature 1: Japanese Unexamined Patent Publication No. 2008-120239

SUMMARY

Technical Problem

The cover may be deformed once an interior part such as the coil is pulled in the gravity direction and the load of the interior part acts on the cover. Desirable in this regard is transmission of the load that the cover receives from the interior part to the base. In the above-described coil device, however, load concentration may arise in the place in the cover where the spacer is provided. In this case, for example, a shape needs to be devised and a material needs to be selected for cover strength enhancement in the place. Desirable as a result is suppressed load concentration in the cover.

The present disclosure describes to provide a coil device capable of suppressing load concentration in a cover.

Solution to Problem

A coil device according to an aspect of the present disclosure includes a coil portion including at least a coil, a housing including a base disposed on a side of a first surface of the coil portion and a cover disposed on a side of a second surface of the coil portion and accommodating the coil portion in an internal space formed by the base and the cover, and a fixing member fixing the cover to the base, in which the fixing member includes a first fixing portion disposed along at least the cover on a first outer periphery of the housing surrounding the base and the cover.

Effects

According to the present disclosure, load concentration in the cover can be suppressed.

BRIEF DESCRIPTION OF DRAWINGS

FIG. 5A is a plan view of the coil device illustrated in FIG. 2.

FIG. 5B is a sectional view taken along line Vb-Vb of FIG. 5A.

FIG. 8A is a plan view of the coil device illustrated in FIG. 7.

FIG. 8B is a sectional view taken along line VIIIb-VIIIb of FIG. 8A.

FIG. 8C is a partially enlarged view of FIG. 8B.

FIG. 13 is a diagram for describing a modification example of the fixing member.

FIG. 15A is a plan view of the coil device illustrated in FIG. 14.

FIG. 15B is a sectional view taken along line XVb-XVb of FIG. 15A.

DESCRIPTION OF EMBODIMENTS

Figure 1:
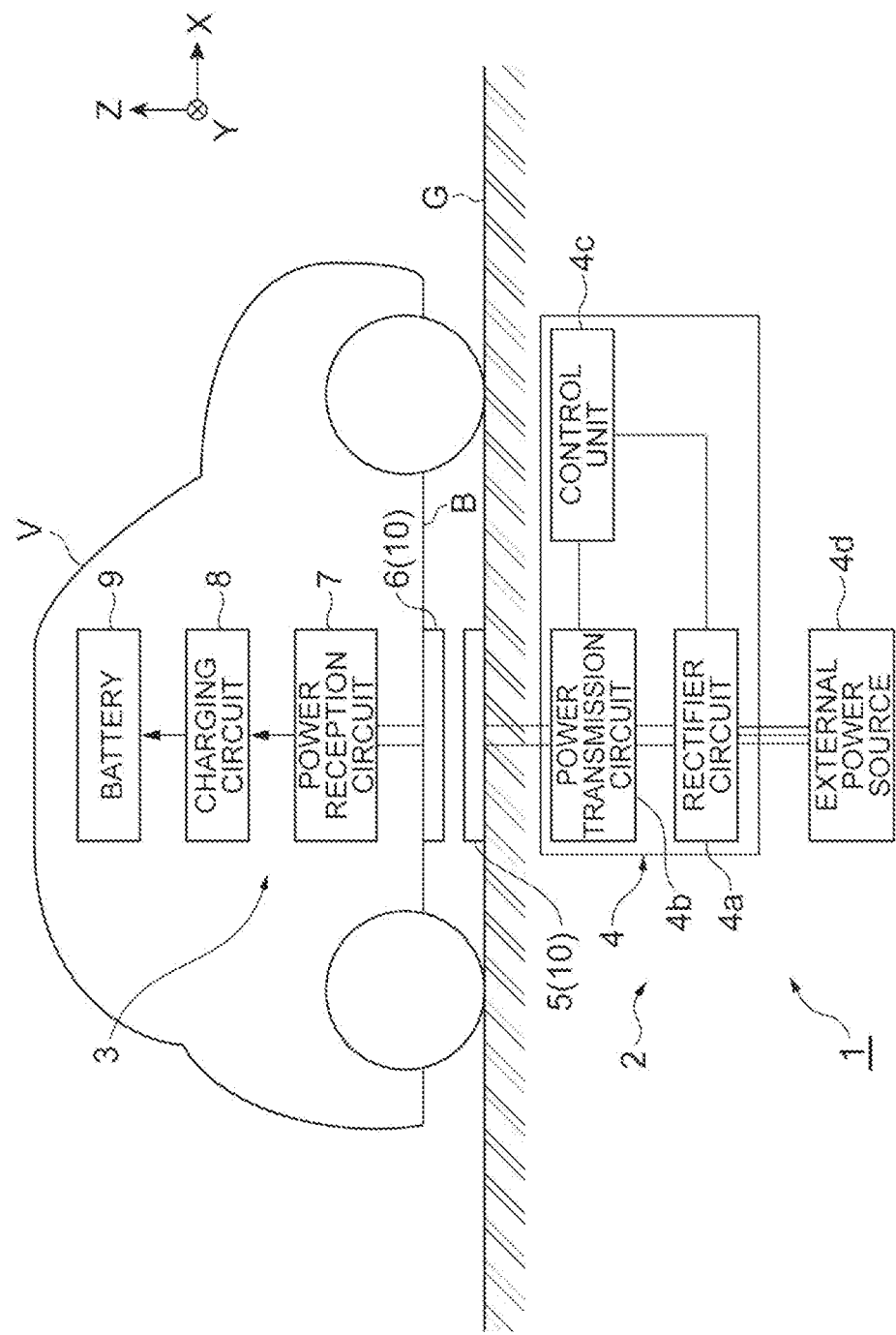
FIG. 1 is a block diagram illustrating a configuration example of a wireless power transfer system provided with a coil device according to a first embodiment.

A coil device according to an aspect of the present disclosure includes a coil portion including at least a coil, a housing including a base disposed on a side of a first surface of the coil portion and a cover disposed on a side of a second surface of the coil portion and accommodating the coil portion in an internal space formed by the base and the cover, and a fixing member fixing the cover to the base, in which the fixing member includes a first fixing portion disposed along at least the cover on a first outer periphery of the housing surrounding the base and the cover.

In the coil device, the fixing member fixing the cover to the base includes the first fixing portion disposed along at least the cover on the first outer periphery of the housing. The fixing member is in linear or planar contact with the cover. As a result, when a load acting on the cover is transmitted to the base by the fixing member, the load in the place of contact of the cover with the fixing member is dispersed. Accordingly, load concentration in the cover can be suppressed even if, for example, the load of the coil portion acts on the cover.

In several aspects, the fixing member may have a belt shape. In this case, the fixing member is in planar contact with the cover, and thus the load in the portion of contact between the fixing member and the cover is easily dispersed.

In several aspects, a width of the fixing member in a middle portion of the housing facing the first surface and the second surface of the coil portion may be smaller than the width of the fixing member in a side surface portion of the housing. In this case, the fixing member covers a wide range of the side surface portion of the housing, and thus the cover can be reliably fixed to the base.

In several aspects, the first outer periphery may pass through a middle portion of the base and a middle portion of the cover. In this case, the fixing member is disposed to pass through at least the middle portion of the base and the middle portion of the cover on the first outer periphery of the housing. Accordingly, a load acting on the cover is easily transmitted to the base.

In several aspects, the fixing member may be disposed over the entire circumference of the first outer periphery and include a joining portion that joins the fixing member with each other. In this case, the fixing member is disposed over the entire circumference of the first outer periphery by the joining portion that joins the fixing member with each other, and thus parts for joining the fixing member with each other can be omitted.

In several aspects, the fixing member may include an intermediate portion along a surface of the cover facing the second surface, both end portions along a surface of the base facing the first surface, and connecting portions interconnecting the intermediate portion and each of the both end portions, and the both end portions may include hooking portions that can be hooked on the base. In this case, the cover can be easily fixed to the base simply by the hooking portion being hooked on the base.

In several aspects, the fixing member may further include a second fixing portion extending along a second outer periphery of the housing surrounding the base and the cover and crossing the first outer periphery, and disposed along at least the cover. In this case, the cover is fixed to the base by the second fixing portion as well as the first fixing portion. Accordingly, the cover can be reliably fixed to the base.

In several aspects, the fixing member may include an inner fixing portion disposed to interconnect the middle portion of the base on the first outer periphery and the middle portion of the cover on the first outer periphery. In this case, a load acting on the middle portion of the cover is easily transmitted to the middle portion of the base via the inner fixing portion.

In several aspects, the housing may include a groove portion where the fixing member is disposed. In this case, a misalignment of the fixing member from the housing can be suppressed.

A coil device according to another aspect of the present disclosure includes a coil portion including at least a coil and a housing including a flat plate-shaped base disposed on a side of a first surface of the coil portion and a box-shaped cover disposed on a side of a second surface of the coil portion and accommodating the coil portion in an internal space formed by the base and the cover, in which the cover includes a fixing portion fixed on a surface of the base on a side opposite to the coil portion and the fixing portion fixes the cover to the base by being fixed on the surface of the base.

In the coil device, the cover is fixed to the base by the fixing portion of the cover being fixed on the surface of the base on the side opposite to the coil portion. A load acting on the cover is dispersed in the box-shaped cover as a whole and transmitted to the base via the fixing portion. Accordingly, load concentration in the cover can be suppressed even if, for example, the load of the coil portion acts on the cover.

Hereinafter, several embodiments of the present disclosure will be described with reference to accompanying drawings. In the description of the drawings, the same reference numerals will be used to refer to the same elements so that the same description is not repeated. The following description will be based on the rectangular coordinate system in the drawings in some cases. In the following description, the "front" corresponds to the positive X direction and the "rear" corresponds to the negative X direction. In addition, the "left" corresponds to the positive Y direction and the "right" corresponds to the negative Y direction. In addition, the "upper" side corresponds to the positive Z direction and the "lower" side corresponds to the negative Z direction.

A wireless power transfer system 1 provided with a coil device 10 according to a first embodiment will be described with reference to FIGS. 1 and 2. The wireless power transfer system 1 is a system for charging a battery mounted in a vehicle V such as an electric car and a hybrid car or directly supplying power to a drive source such as an electric motor. The vehicle V includes configurations required for traveling such as an electric motor, a steering wheel, and a brake although these configurations are not illustrated in FIG. 1.

Figure 2:
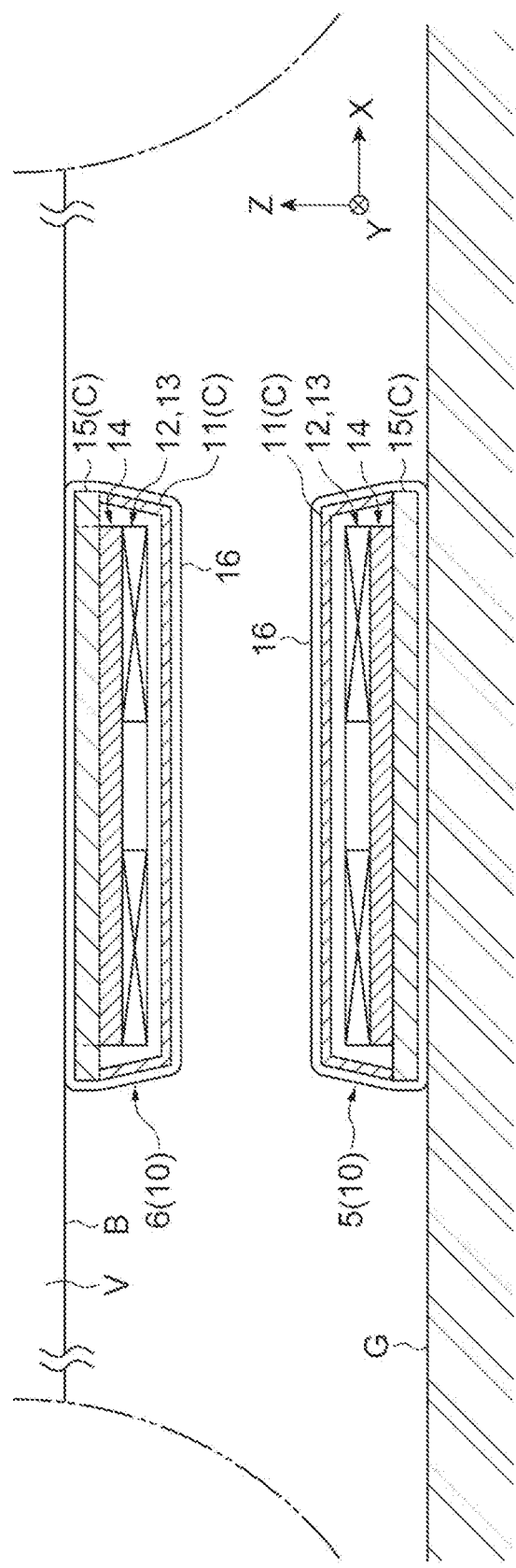
FIG. 2 is a side sectional view illustrating a power transmission side coil device and a power reception side coil device constituting the wireless power transfer system illustrated in FIG. 1.

As illustrated in FIGS. 1 and 2, the wireless power transfer system 1 includes a power transmitter 2 installed below a road surface G and a power receiver 3 disposed on the vehicle V side. The power transmitter 2 includes a power source portion 4 and a power transmission coil device 5 connected to the power source portion 4. The power receiver 3 includes a power reception coil device (coil device) 6, a power reception circuit 7, and a charging circuit 8. The power transmitter 2 wirelessly transmits power (power for charging a battery 9) to the power receiver 3 of the vehicle V when the vehicle V traveling on the ground is stationary at a predetermined position (position where an electromagnetic coupling circuit is formed). The power reception coil device 6 receives the power (AC power) wirelessly supplied from the power transmission coil device 5 on the power transmission side.

The power transmission coil device 5 is installed on the road surface G The power source portion 4 includes a rectifier circuit 4a, a power transmission circuit 4b, and a control unit 4c. The power source portion 4 is connected to an external power source 4d. The external power source 4d is a power source supplying power required for generating the power that should be transmitted to the vehicle V. The external power source 4d is a power source supplying single-phase AC power such as a commercial AC power source.

The rectifier circuit 4a is a circuit rectifying the AC power supplied from the external power source 4d and converting the AC power into DC power. The rectifier circuit 4a may include a power factor correction [PFC] function and a buck-boost function.

The power transmission circuit 4b wirelessly supplies the power supplied from the rectifier circuit 4a to the vehicle V via the electromagnetic coupling circuit formed by the power transmission coil device 5 and the power reception coil device 6. The power transmission circuit 4b is provided with, for example, an inverter circuit. The power transmission circuit 4b converts the DC power from the rectifier circuit 4a into AC power (high-frequency power) higher in frequency than the AC power of the external power source 4d and gives the AC power to the power transmission coil device 5. As a result, wireless power transfer is performed between the power transmission coil device 5 and the power reception coil device 6. On the output side of the inverter circuit, the power transmission circuit 4b can be provided with a capacitor constituting a power transmission side resonance circuit along with a coil 12 (refer to FIG. 2) included in the power transmission coil device 5.

The control unit 4c is an electronic control unit including, for example, a central processing unit [CPU], a read only memory [ROM], a random access memory [RAM], and the like. The control unit 4c controls power supply from the power transmission coil device 5 to the power reception coil device 6. The control unit 4c controls each circuit of the power source portion 4 (such as the rectifier circuit 4a and the power transmission circuit 4b) such that the magnitude of the power supplied from the power transmission coil device 5 to the power reception coil device 6 is changed.

The electromagnetic coupling circuit is formed by the power transmission coil device 5 and the power reception coil device 6 being positioned close to each other and the coil 12 included in the power transmission coil device 5 and a coil 12 included in the power reception coil device 6 being positioned close to each other. The electromagnetic coupling circuit means a circuit in which wireless power transfer from the coil 12 on the power transmission side to the coil 12 on the power reception side is performed with the coils 12 and 12 electromagnetically coupled. The electromagnetic coupling circuit may be a circuit performing the power feeding by an "electromagnetic induction method" or a circuit performing the power feeding by a "magnetic resonance method".

The power reception circuit 7 converts the AC power from the power reception coil device 6 into DC power and outputs the DC power to the charging circuit 8. The power reception circuit 7 can be provided with a capacitor constituting a power reception side resonance circuit along with the coil 12 on the power reception side.

The charging circuit 8 has an input terminal connected to the output terminal of the power reception circuit 7 and an output terminal connected to the input terminal of the battery 9. The charging circuit 8 converts the power (DC power) from the power reception circuit 7 into desired power and supplies the power to the battery 9. The battery 9 is a rechargeable battery (for example, a secondary battery such as a lithium ion battery and a nickel hydrogen battery) mounted in the vehicle V. The battery 9 supplies power to an electric traveling motor (not illustrated) or the like.

The power transmission coil device 5 and the power reception coil device 6 according to the first embodiment will be described below with reference to FIGS. 2 to 5B.

As illustrated in FIG. 2, the power transmission coil device 5 and the power reception coil device 6 are disposed at a predetermined distance from each other to face each other in the up-down direction. The power transmission coil device 5 is disposed to protrude upward from the road surface G The power reception coil device 6 is attached to, for example, the lower surface of a chassis B of the vehicle V. The power transmission coil device 5 and the power reception coil device 6 have, for example, a flat frustum shape or a rectangular parallelepiped shape. The power transmission coil device 5 may also be embedded in the road surface G without protruding from the road surface G As an example, the power transmission coil device 5 and the power reception coil device 6 are the coil devices 10 that have the same configuration. Accordingly, the power reception coil device 6 will be described as the coil device 10 and the same description will be omitted with regard to the power transmission coil device 5 in some cases.

Figure 3:
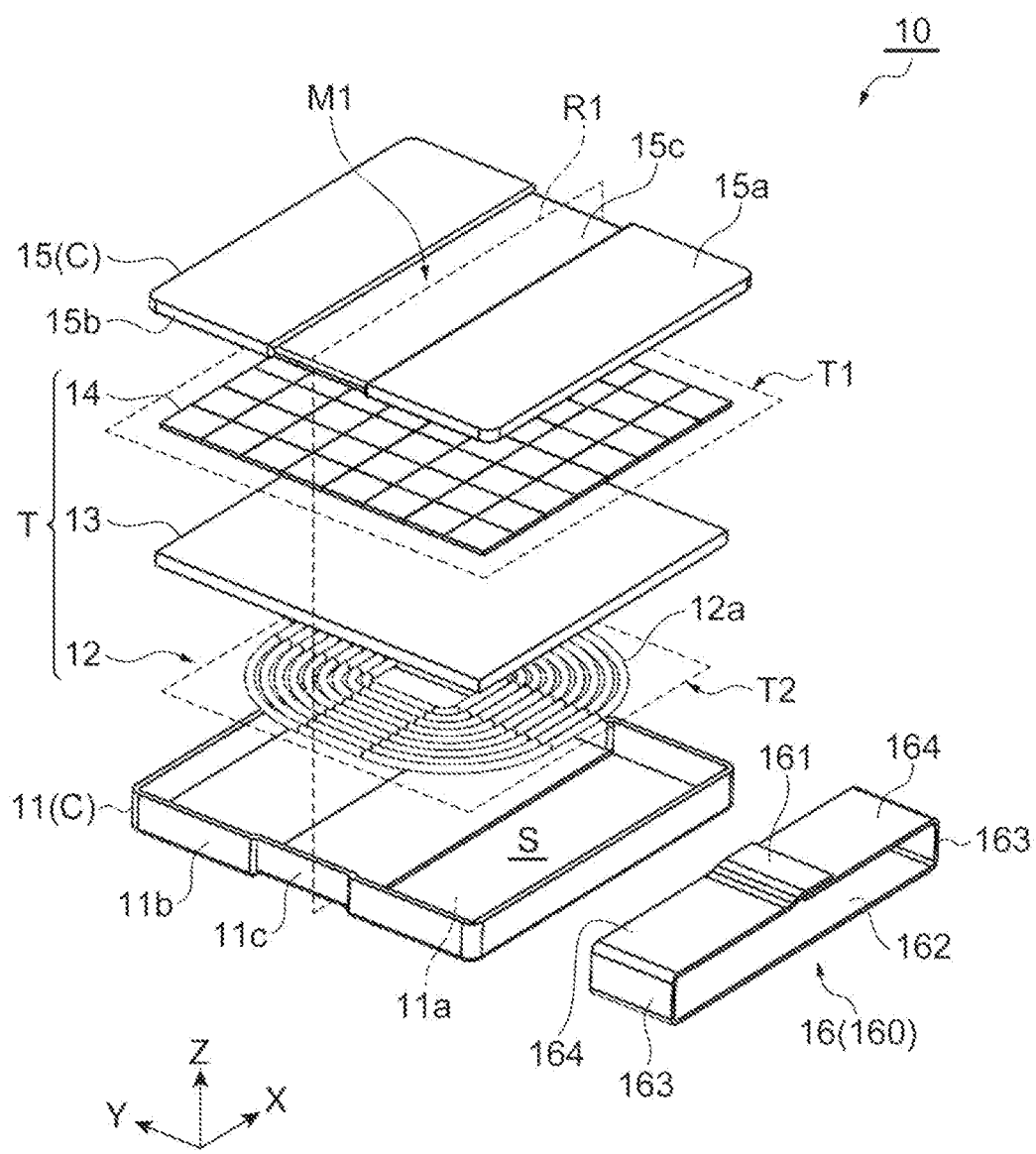
FIG. 3 is an exploded perspective view of the coil device illustrated in FIG. 2.
Figure 4A:
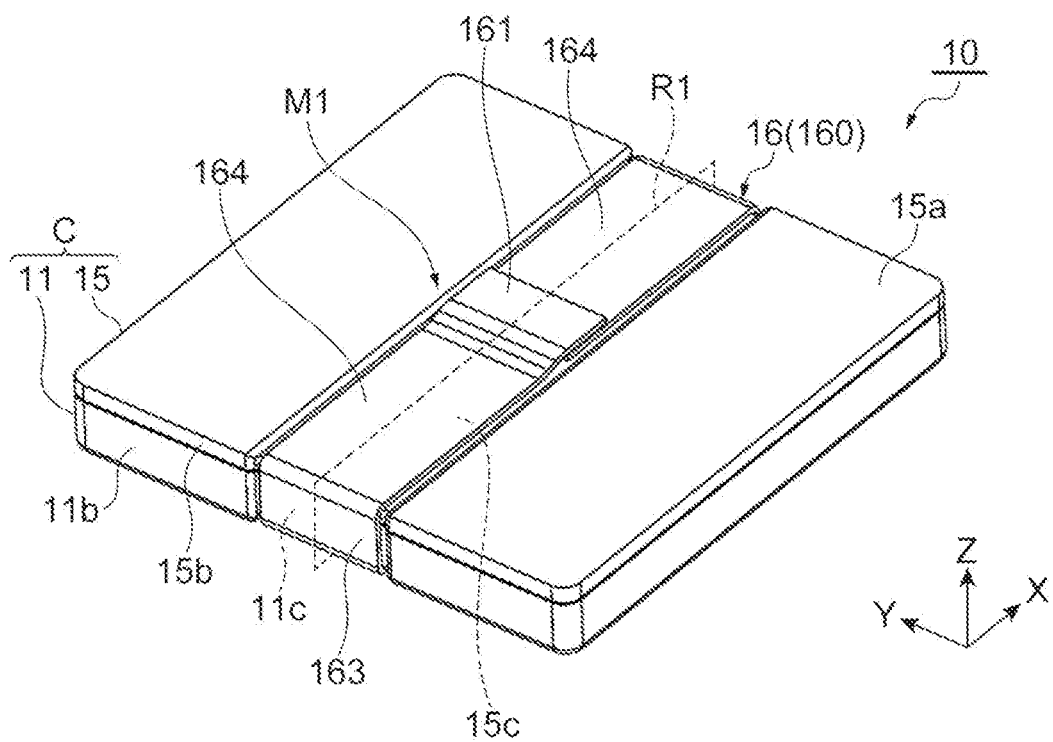
FIG. 4A is a perspective view of the coil device illustrated in FIG. 2.
Figure 4B:
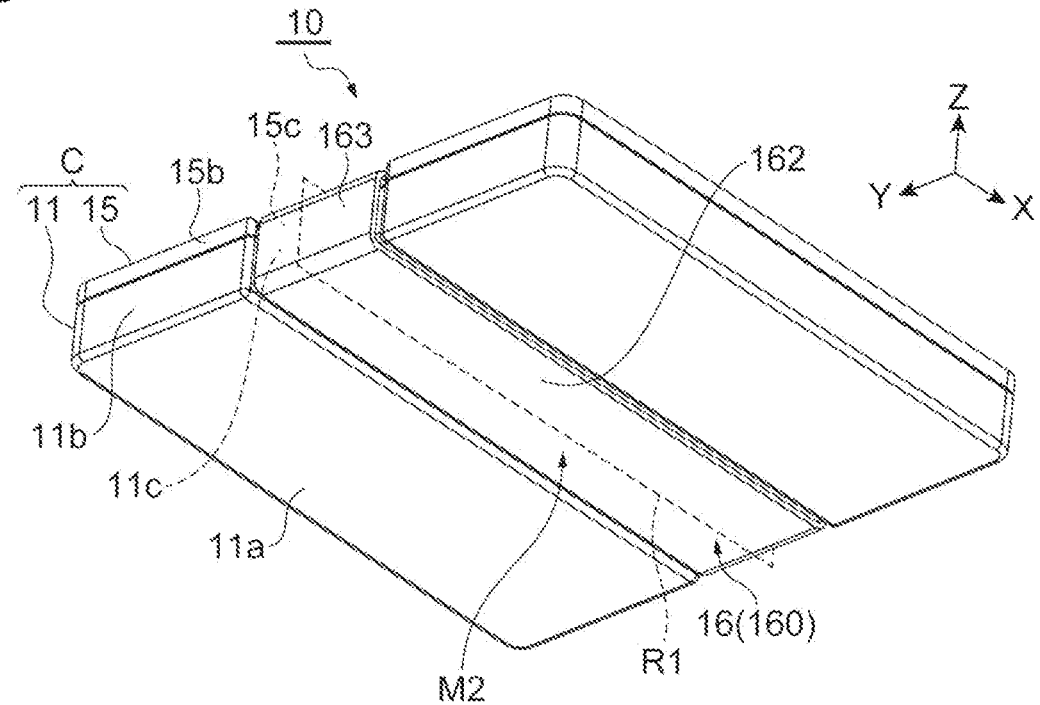
FIG. 4B is a perspective view of the coil device illustrated in FIG. 2.

As illustrated in FIG. 3, the coil device 10 is provided with a housing C including a cover 11 and a base 15 and a belt-shaped fixing member 16 fixing the cover 11 to the base 15. The housing C accommodates a coil portion T in an accommodating space (internal space) S formed by the cover 11 and the base 15 when the cover 11 is fixed to the base 15. The coil portion T is a flat interior part including at least the coil 12 and including a first surface T1 and a second surface T2. As an example, the coil portion T includes the coil 12, a holding member 13, and a ferrite portion 14. The coil 12, the holding member 13, and the ferrite portion 14 are disposed in sequence from the cover 11 to the base 15 (from the second surface T2 to the first surface T1) in the accommodating space S. One or both of the holding member 13 and the ferrite portion 14 may be omitted in the coil portion T.

The cover 11 is a box body disposed on the side of the second surface T2 of the coil portion T and protecting the coil 12, the holding member 13, and the ferrite portion 14. The cover 11 may have, for example, a flat rectangular parallelepiped shape including a bottom portion 11a and a side portion (side surface portion of the housing) 11b. The bottom portion 11a faces the second surface T2 of the coil portion T. The middle portion of the bottom portion 11a is a middle portion M2 (refer to FIG. 4B) of the cover 11 and is the middle portion of the housing C facing the first surface T1 and the second surface T2 of the coil portion T. The cover 11 is formed of a non-magnetic and insulating material such as glass fiber reinforced plastic (GFRP).

The cover 11 includes a groove portion 11c where the fixing member 16 is disposed. The groove portion 11c is a recessed portion continuously formed with a predetermined width and a predetermined depth in the bottom portion 11a and the side portion 11b (refer to FIGS. 4A and 4B). In the bottom portion 11a, the groove portion 11c is formed to pass through the middle portion M2 of the cover 11 along the X direction. In the side portion 11b, the groove portion 11c is formed to extend along the Z direction from both X-direction end portions of the groove portion 11c in the bottom portion 11a. The predetermined width of the groove portion 11c can be set in accordance with the width of the fixing member 16. The predetermined depth of the groove portion 11c can be set in accordance with the thickness of the fixing member 16. The predetermined width of the groove portion 11c can be equal to the width of the fixing member 16. The predetermined depth of the groove portion 11c can be equal to the thickness of the fixing member 16 (refer to FIG. 5B).

The coil 12 is formed by a conductive wire 12a wound in a substantially rectangular spiral shape in the same plane and generates an induced current. The coil 12 is a so-called circular coil. The circular coil is a coil in which the conductive wire 12a is wound in a planar spiral shape. The planar spiral shape is a shape in which the conductive wire is wound from the outside to the inside or from the inside to the outside such that the winding axis is surrounded. The conductive wire 12a may be wound in a planar spiral shape in the coil 12, and the coil 12 may have one layer or multiple layers. The coil 12 may have various shapes, such as rectangular, circular, and oblong, when seen from the winding axis direction. Used as an example of the conductive wire 12a is a Ritz wire in which a plurality of conductor wires insulated from each other are twisted together. The conductive wire 12a may be a single wire of copper or aluminum or a bus bar or the like.

The holding member 13 is a flat plate-shaped member (so-called bobbin) for holding the coil 12. For example, the coil 12 may be fitted in a groove portion formed in the holding member 13. A material with electrical insulation properties (such as silicone and polyphenylene sulfide resin) is used as the material of the holding member 13.

The ferrite portion 14 is, for example, a rectangular flat plate-shaped ferrite core. The ferrite portion 14 is a magnetic body and sets the direction of and concentrates magnetic lines of force generated from the coil 12. The ferrite portion 14 may be substantially identical to the holding member 13 in shape and size in, for example, a plan view. Any shape and size can be set for the ferrite portion 14 insofar as the ferrite portion 14 fits in the accommodating space that is surrounded by the cover 11 and the base 15. The planar shape of the ferrite portion 14 is not limited to a square shape and any shape can be set as the planar shape of the ferrite portion 14.

The base 15 is a plate-shaped member disposed on the side of the first surface T1 of the coil portion T so that the rigidity of the coil device 10 as a whole is ensured and leakage flux to the outside is shielded. The base 15 may also be, for example, a flat plate including a plate portion 15a and a side portion (side surface portion of the housing) 15b. The plate portion 15a faces the first surface T1 of the coil portion T. The middle portion of the plate portion 15a is a middle portion M1 of the base 15 and is the middle portion of the housing C facing the first surface T1 and the second surface T2 of the coil portion T. The base 15 may be composed of, for example, one plate material or a plurality of combined plate materials. The shapes of the base 15 in the X direction and the Y direction are, as an example, identical to the shapes of the cover 11 in the X direction and the Y direction (refer to FIGS. 3, 4A and 4B). The base 15 is non-magnetic and electrically conductive and is formed of a high-rigidity material (such as aluminum and copper).

The base 15 includes a groove portion 15c where the fixing member 16 is disposed. The groove portion 15c is a recessed portion continuously formed with a predetermined width and a predetermined depth in the plate portion 15a and the side portion 15b (refer to FIGS. 4A and 4B). In the plate portion 15a, the groove portion 15c is formed to pass through the middle portion M1 of the base 15 along the X direction. In the side portion 15b, the groove portion 15c is formed to extend along the Z direction from both X-direction end portions of the groove portion 15c in the plate portion 15a. The predetermined width of the groove portion 15c can be set in accordance with the width of the fixing member 16. The predetermined depth of the groove portion 15c can be set in accordance with the thickness of the fixing member 16. The predetermined width of the groove portion 15c can be equal to the width of the fixing member 16. The predetermined depth of the groove portion 15c can be approximately twice the thickness of the fixing member 16 in the plate portion 15a. The predetermined depth of the groove portion 15c can be equal to the thickness of the fixing member 16 in the side portion 15b (refer to FIG. 5B).

The base 15 has rigidity to the extent that a misalignment of the cover 11 with respect to the base 15 or deformation of the cover 11 can be suppressed when a load acting on the cover 11 is transmitted to the base 15 by the fixing member 16. Examples of the load acting on the cover 11 include a load for supporting interior parts such as the coil portion T and a load directly acting on the cover 11 from the outside of the coil device 10. In a case where the coil device 10 is attached to the vehicle V such that the cover 11 is on the vertically lower side, for example, the cover 11 being deformed to hang vertically downward can be suppressed.

The fixing member 16 fixes the cover 11 to the base 15 and transmits a load acting on the cover 11 to the base 15. The fixing member 16 includes a first fixing portion 160 disposed at least along the cover 11 on a first outer periphery R1 of the housing C. The first outer periphery R1 is an outer periphery of the housing C surrounding the housing C by using the Y direction as an axis and passing through the middle portion M2 of the cover 11 and the middle portion M1 of the base 15. The first outer periphery R1 is not particularly limited insofar as the first outer periphery R1 is an outer periphery of the housing C surrounding the cover 11 and the base 15.

The fixing member 16 is disposed over the entire circumference of the first outer periphery R1. The fixing member 16 includes an intermediate portion 162 disposed along the bottom portion 11a of the cover 11, a connecting portion 163 disposed along the side portion 11b of the cover 11 and the side portion 15b of the base 15, and both end portions 164 disposed along the plate portion 15a of the base 15. The fixing member 16 is in planar contact with the cover 11 in the intermediate portion 162 and the connecting portion 163. The intermediate portion 162 and the connecting portion 163 disperse a load in the places of contact with the cover 11. The both end portions 164 transmit a load transmitted from the cover 11 to the base 15 in the places of contact of the intermediate portion 162 and the connecting portion 163 with the cover 11.

The fixing member 16 is annularly formed by, for example, both longitudinal-direction end portions of an elongated belt-shaped member that has a predetermined width being superposed on and joined to each other in a joining portion 161. The fixing member 16 may be configured to practically function as an elongated belt-shaped member that has a predetermined width by a plurality of linear members such as string materials, wires, and wire rods being apposed. The material of the fixing member 16 is not particularly limited insofar as the material is electrically non-conductive. The material of the fixing member 16 may be an elastic body such as cloth, resin, rubber, and an elastomer, may be GFRP or the like, or can be selected from various materials. The fixing member 16 may be directly fixed to the base 15 by, for example, an adhesive (not illustrated), a bolt (not illustrated), or a hook (not illustrated).

Figure 6:
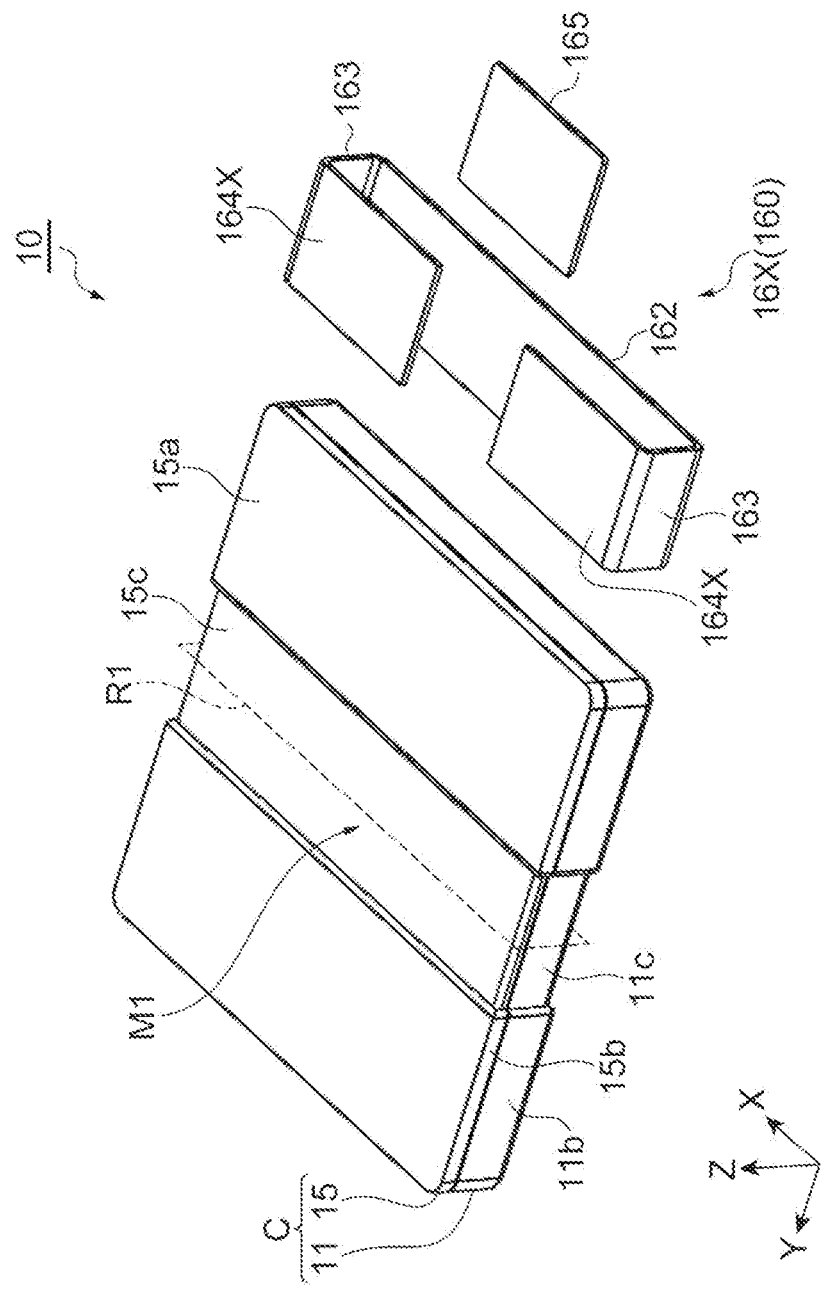
FIG. 6 is a diagram for describing a modification example of a fixing member.

As illustrated in FIG. 6, the fixing member 16 may be modified in the form of a fixing member 16X. The fixing member 16X is annularly formed by both end portions 164X divided in the middle portion M1 of the base 15 being fixed via a holding tool 165 instead of the joining portion 161 and the both end portions 164 of the fixing member 16. Also in this case, the intermediate portion 162 and the connecting portion 163 disperse a load in the places of contact with the cover 11. The both end portions 164X transmit a load transmitted from the cover 11 to the base 15 in the places of contact of the intermediate portion 162 and the connecting portion 163 with the cover 11.

Figure 7:
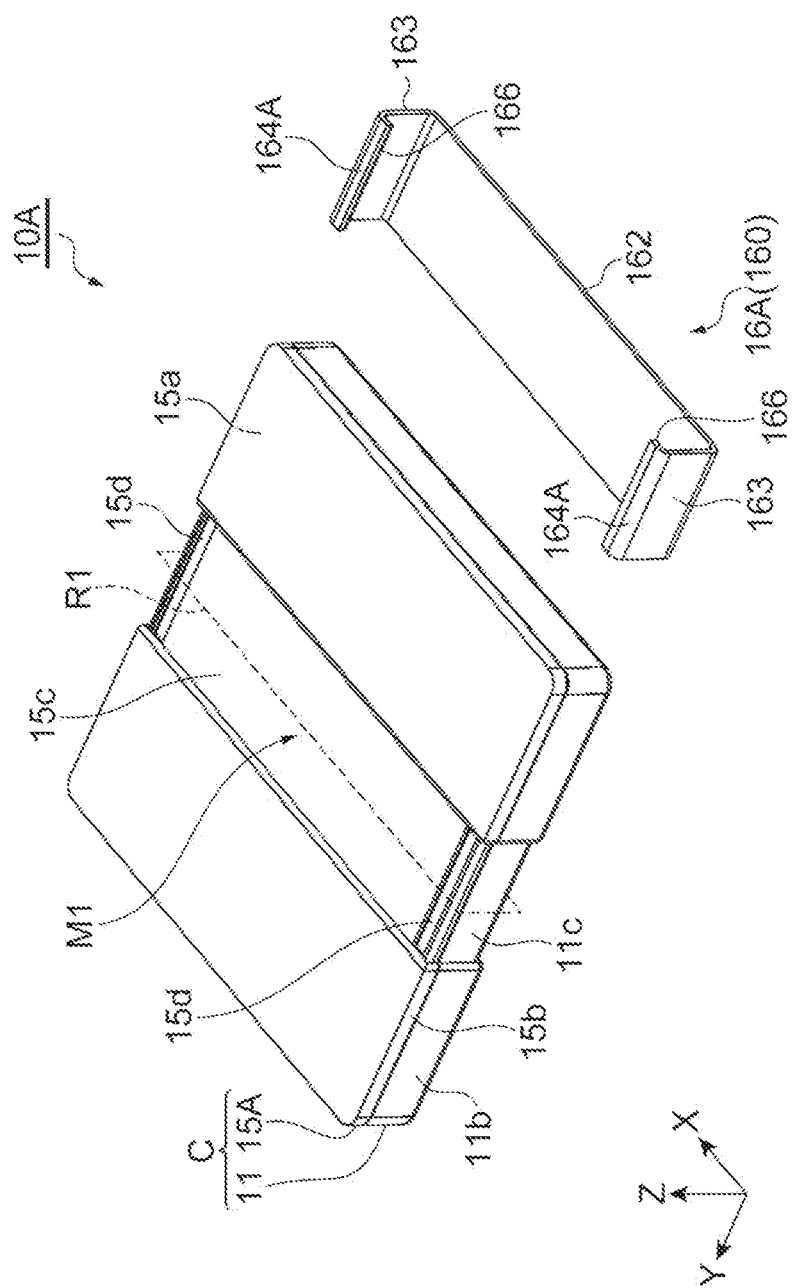
FIG. 7 is a perspective view of a coil device according to a second embodiment.

A coil device 10A according to a second embodiment will be described with reference to FIGS. 7 and 8C. The coil device 10A differs from the coil device 10 in that the coil device 10A is provided with a base 15A including recessed portions 15*d* instead of the base 15 and a fixing member 16A including hooking portions 166 that can be hooked on the recessed portions 15*d* instead of the fixing member 16.

The base 15A includes the recessed portions 15*d* respectively disposed in both X-direction end portions of the groove portion 15*c* of the plate portion 15*a*. The recessed portion 15*d* is a fixing groove extending in the Y direction and is recessed to, for example, have a hat-shaped section when seen perpendicularly to the Y direction.

The fixing member 16A includes the intermediate portion 162 along the bottom portion 11*a* including the surface of the cover 11 facing the second surface T2, the connecting portions 163 extending along the side portions 15*b* of the base 15 from the intermediate portion 162, and both end portions 164A disposed along the plate portion 15*a* of the base 15 from the connecting portions 163. The both end portions 164A include the hooking portions 166 disposed at positions corresponding to the recessed portions 15*d* of the base 15A. The hooking portion 166 is a projecting rib protruding downward and extending in the Y direction. Accordingly, the hooking portion 166 can be hooked on the recessed portion 15*d* of the base 15A.

In the coil device 10 as described above, the hooking portions 166 of the both end portions 164A are caught by and hooked on the recessed portions 15*d* of the base 15 once, for example, the fixing member 16A is pushed in from the cover 11 side with respect to the cover 11 and the base 15A with the coil portion T accommodated in the accommodating space S. As a result, an X-direction movement of the both end portions 164A is regulated, and thus a load transmitted from the cover 11 is transmitted to the base 15A and the cover 11 is fixed to the base 15A.

Figure 9:
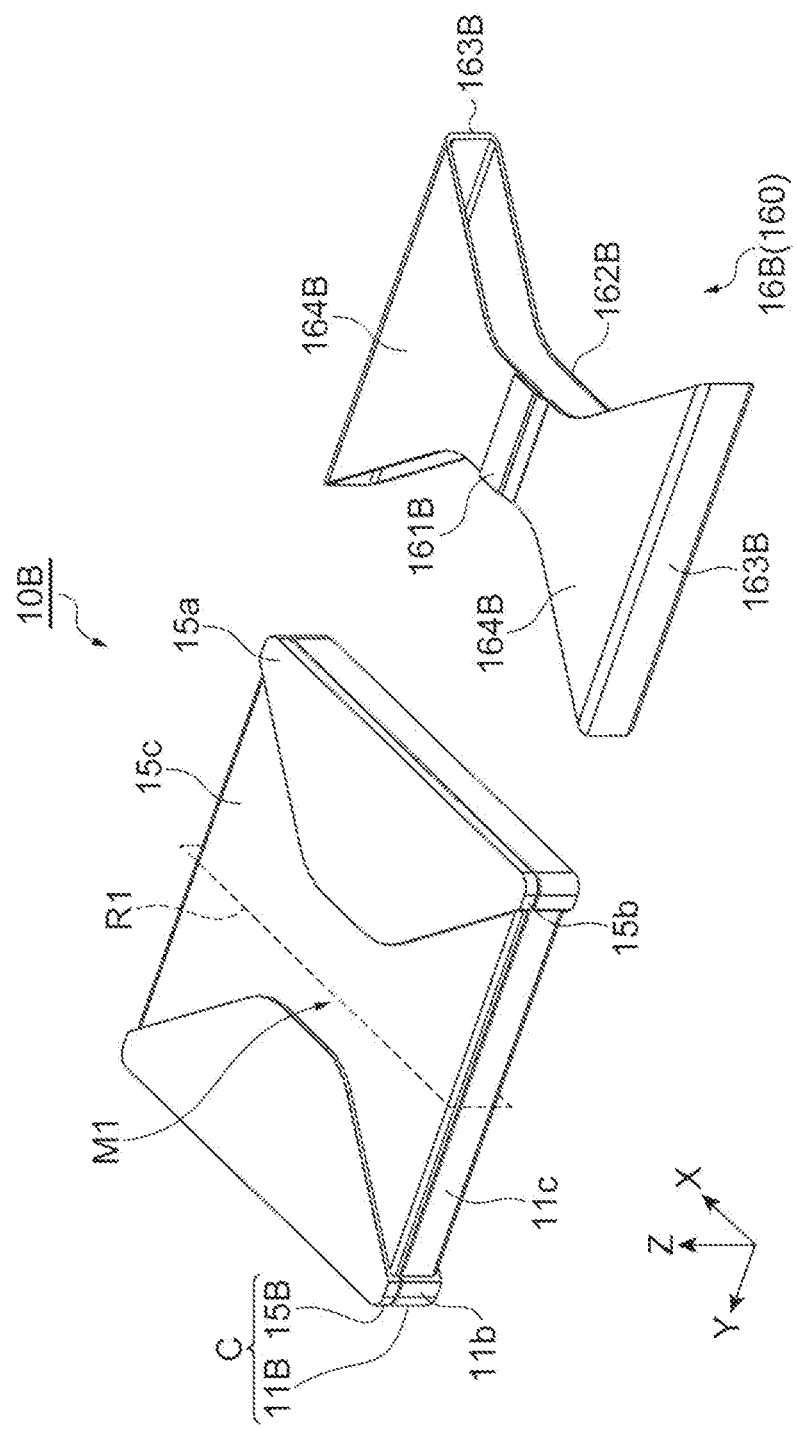
FIG. 9 is a perspective view of a coil device according to a third embodiment.

A coil device 10B according to a third embodiment will be described with reference to FIGS. 9 and 10. The coil device 10B differs from the coil device 10 in that the coil device 10B is provided with a cover 11B including the groove portion 11*c* partially expanded in width instead of the cover 11, a base 15B including the groove portion 15*c* partially expanded in width instead of the base 15, and a fixing member 16B partially expanded in width instead of the fixing member 16.

The width of the fixing member 16B in the middle portions M1 and M2 of the housing C facing the first surface T1 and the second surface T2 of the coil portion T is smaller than the width of the fixing member 16B in the side portion 11*b* and the side portion 15*b* (side surface portions of the housing C). The width of the fixing member 16B is the dimension of the fixing member 16B in a direction crossing the extension direction of the first outer periphery R1.

Specifically, the width of an intermediate portion 162B along the cover 11B increases from the middle portion M2 of the cover 11B toward the side portion 11*b*. The intermediate portion 162B has a minimum width in the middle portion M2 of the cover 11B. The width of both end portions 164B along the base 15B increases from the middle portion M1 of the base 15B toward the side portions 15*b*. The both end portions 164B have a minimum width in the middle portion M1 of the base 15B. In the side portion 11*b* and the side portion 15*b*, a connecting portion 163B covers almost the whole of the side portion 11*b* and the side portion 15*b*. As is the case with the joining portion 161, the fixing member 16B is annularly formed by joining in a joining portion 161B.

The widths of the groove portion 11*c* of the cover 11B and the groove portion 15*c* of the base 15B are set in accordance with the width of the fixing member 16B. In other words, the width of the groove portion 11*c* in the middle portion M2 of the cover 11B increases toward the side portion 11*b* of the cover 11B. The width of the groove portion 15*c* in the middle portion M1 of the base 15B increases toward the side portion 15*b* of the base 15B.

The fixing member 16B as described above is in planar contact with the cover 11B in the intermediate portion 162B and the connecting portion 163B. The intermediate portion 162B and the connecting portion 163B disperse a load in the places of contact with the cover 11B. The both end portions 164B transmit a load transmitted from the cover 11B to the base 15B in the places of contact of the intermediate portion 162B and the connecting portion 163B with the cover 11B.

Figure 10:
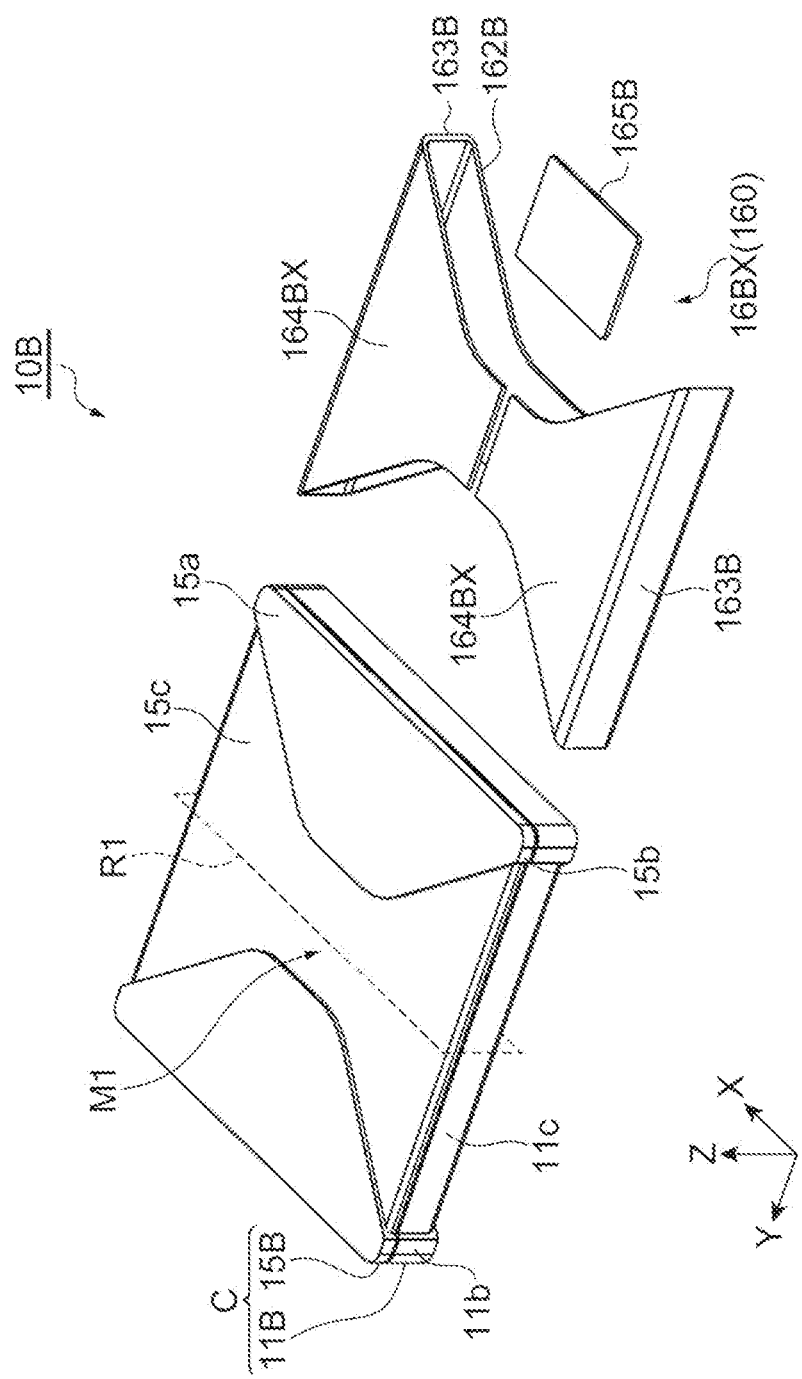
FIG. 10 is a diagram for describing a modification example of the fixing member.

As illustrated in FIG. 10, the fixing member 16B may be modified in the form of a fixing member 16BX. In the fixing member 16BX, both end portions 164BX divided in the middle portion M1 of the base 15B are fixed via a holding tool 165B. Also in this case, the intermediate portion 162B and the connecting portion 163B disperse a load in the places of contact with the cover 11B. The both end portions 164BX transmit a load transmitted from the cover 11B to the base 15B in the places of contact of the intermediate portion 162B and the connecting portion 163B with the cover 11B.

Figure 11:
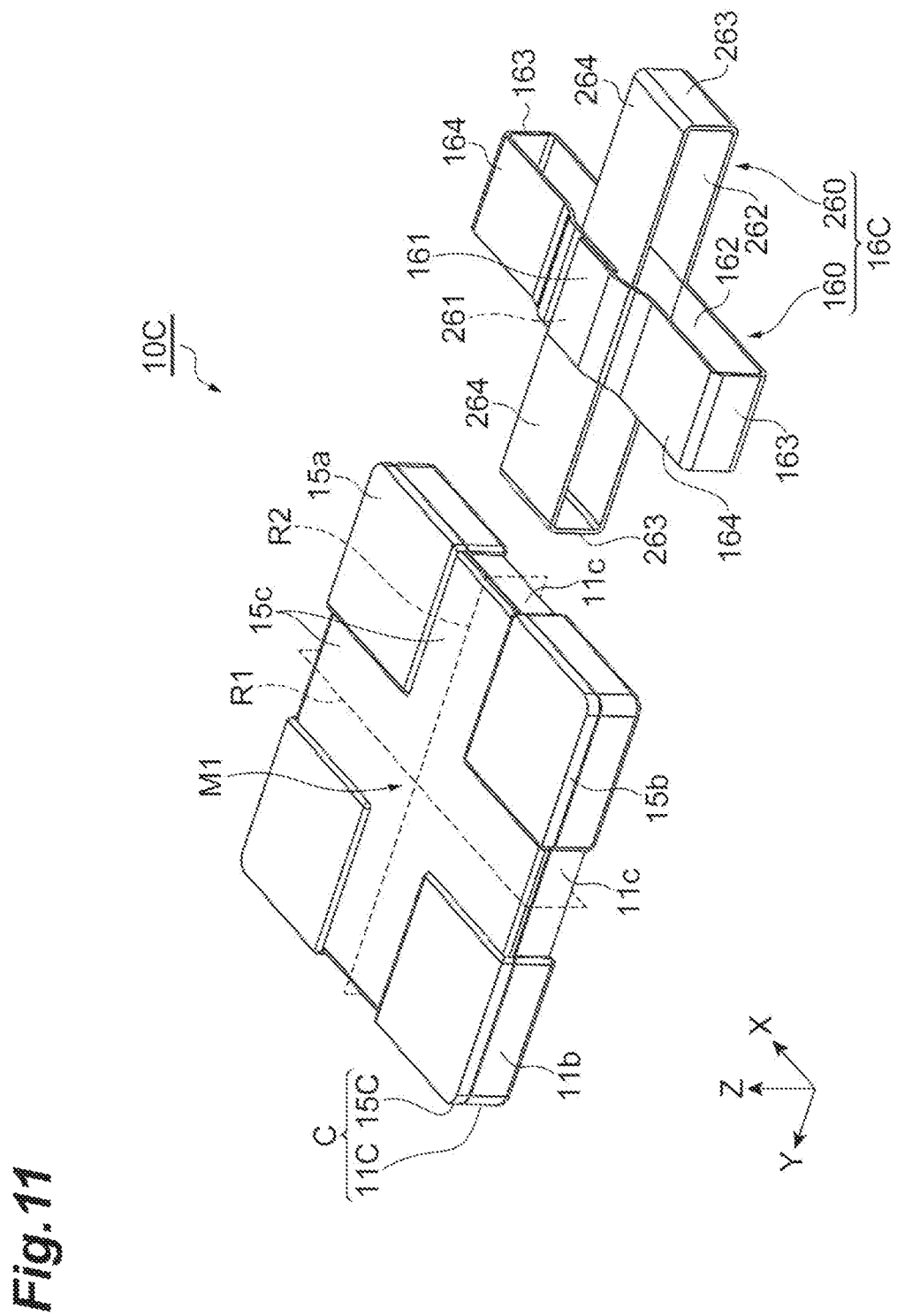
FIG. 11 is a perspective view of a coil device according to a fourth embodiment.
Figure 12A:
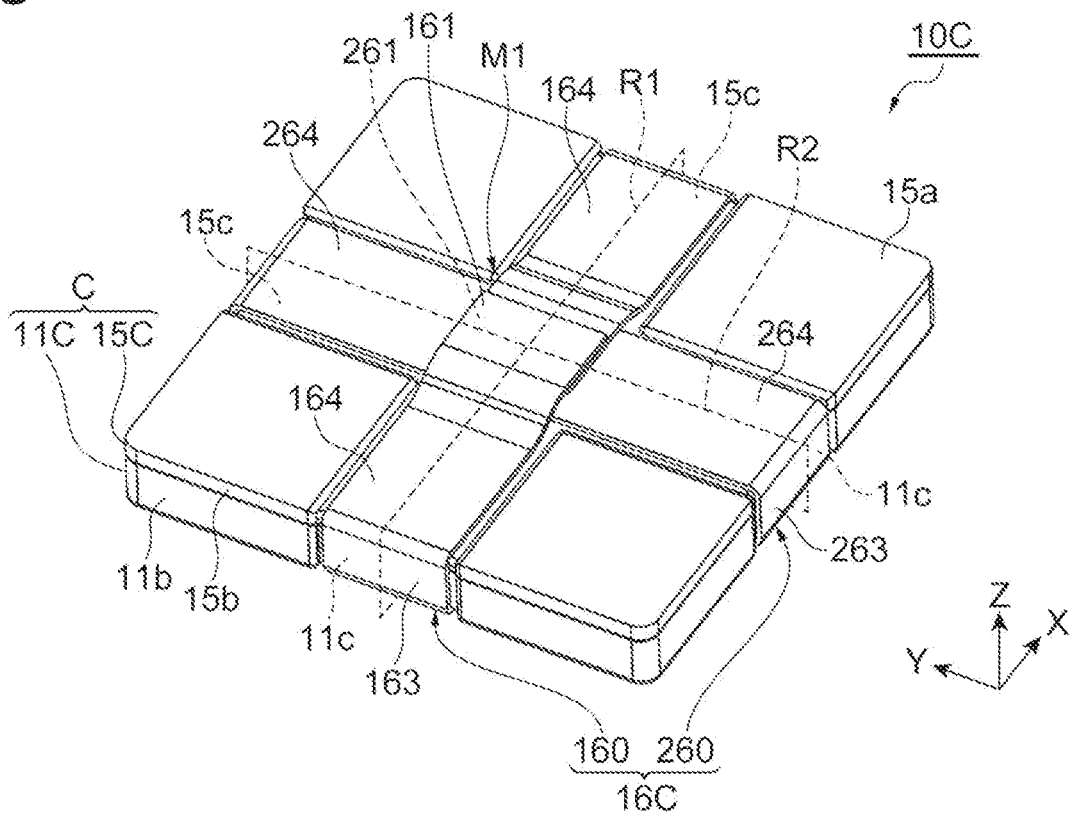
FIG. 12A is a perspective view of the coil device illustrated in FIG. 11.
Figure 12B:
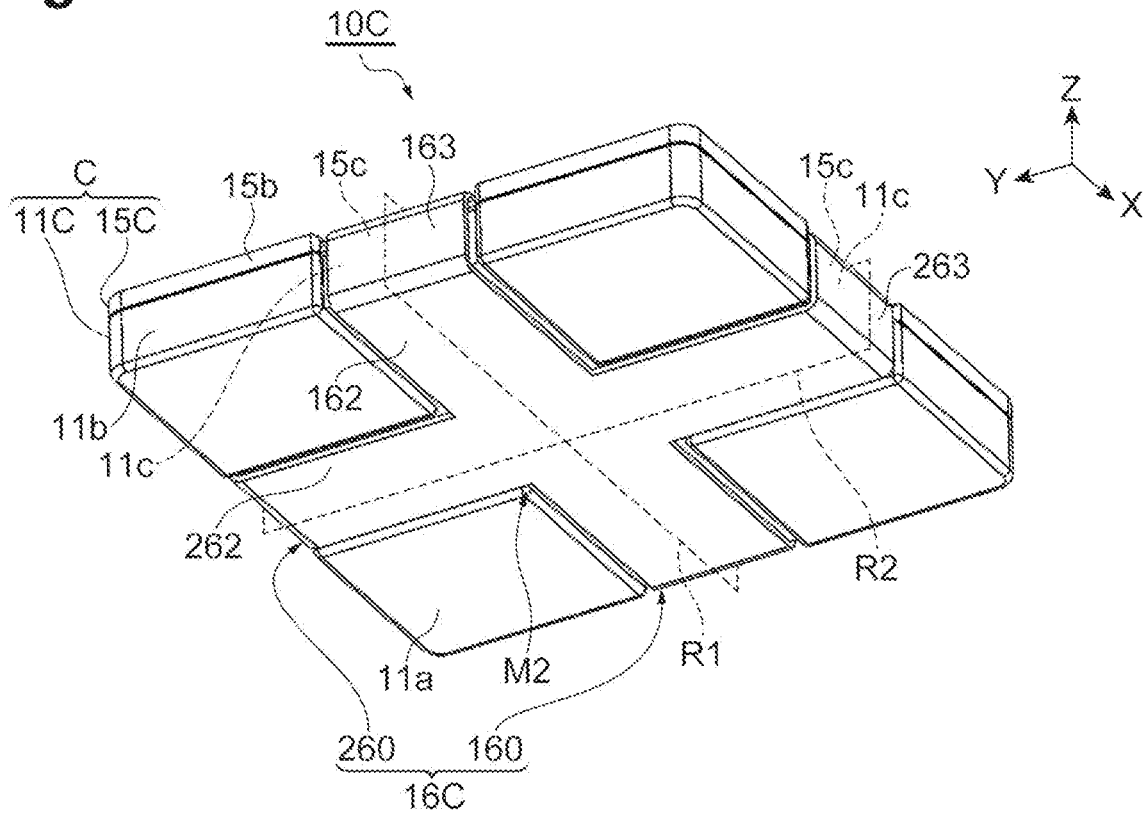
FIG. 12B is a perspective view of the coil device illustrated in FIG. 11.

A coil device 10C according to the third embodiment will be described with reference to FIGS. 11, 12A and 12B. The coil device 10C differs from the coil device 10 in that the coil device 10C is provided with a cover 11C further including the groove portion 11*c* along a second outer periphery R2 instead of the cover 11, a base 15C further including the groove portion 15*c* along the second outer periphery R2 instead of the base 15, and a fixing member 16C further including a second fixing portion 260 disposed along the second outer periphery R2 instead of the fixing member 16.

The fixing member 16C includes the first fixing portion 160 and the second fixing portion 260 surrounding the cover 11C and the base 15C, extending along the second outer periphery R2 of the housing C crossing the first outer periphery R1, and disposed along at least the cover 11C. The second outer periphery R2 can be an outer periphery of the housing C surrounding the housing C by using the X direction as an axis and passing through the middle portion M2 of the cover 11C and the middle portion M1 of the base 15C. In other words, the second outer periphery R2 can be orthogonal to the first outer periphery R1.

The first fixing portion 160 of the fixing member 16C is similar in configuration to the first fixing portion 160 of the fixing member 16. The second fixing portion 260 is disposed over the entire circumference of the second outer periphery R2. The second fixing portion 260 includes an intermediate portion 262 disposed along the bottom portion 11*a* of the cover 11C, connecting portions 263 disposed along the side portion 11*b* of the cover 11C and the side portion 15*b* of the base 15C, and both end portions 264 disposed along the plate portion 15*a* of the base 15C.

The cover 11C includes the groove portions 11*c* where the first fixing portion 160 and the second fixing portion 260 of the fixing member 16C are disposed. The groove portions 11*c* can be formed to pass through the middle portion M2 of the cover 11C along the X direction and the Y direction in the bottom portion 11*a*. In the side portions 11*b*, the groove portions 11*c* are respectively formed to extend along the Z direction from both X-direction end portions and both Y-direction end portions of the groove portions 11*c* in the bottom portion 11*a*.

The base 15C includes the groove portions 15*c* where the first fixing portion 160 and the second fixing portion 260 of the fixing member 16C are disposed. The groove portions 15*c* can be formed to pass through the middle portion M1 of the base 15C along the X direction and the Y direction in the plate portion 15a. In the side portions 15b, the groove portions 15c are respectively formed to extend along the Z direction from both X-direction end portions and both Y-direction end portions of the groove portions 15c in the plate portion 15a.

The first fixing portion 160 is annularly formed by, for example, an elongated belt-shaped member that has a predetermined width being joined to each other in the joining portion 161 where both longitudinal-direction end portions of the first fixing portion 160 are superposed on each other. The second fixing portion 260 is annularly formed by, for example, an elongated belt-shaped member that has a predetermined width being joined to each other in a joining portion 261 where both longitudinal-direction end portions of the second fixing portion 260 are superposed on each other. The first fixing portion 160 and the second fixing portion 260 may be formed integrally or separately.

The fixing member 16C as described above is in planar contact with the cover 11C in the intermediate portion 162, the intermediate portion 262, the connecting portion 163, and the connecting portion 263. The intermediate portion 162, the connecting portion 163, the intermediate portion 262, and the connecting portion 263 disperse a load in the places of contact with the cover 11C. The both end portions 164 and the both end portions 264 transmit a load transmitted from the cover 11C to the base 15C in the places of contact with the cover 11C.

As illustrated in FIG. 13, the fixing member 16C may be modified in the form of a fixing member 16CX. In the fixing member 16CX, the both end portions 164X and both end portions 264X divided in the middle portion M1 of the base 15C are fixed via a holding tool 165CX. Also in this case, the intermediate portion 162B and the connecting portion 163B disperse a load in the places of contact with the cover 11C. The both end portions 164X and the both end portions 264X transmit a load transmitted from the cover 11C to the base 15C in the places of contact of the intermediate portion 162, the connecting portion 163, the intermediate portion 262, and the connecting portion 263 with the cover 11C.

The fixing member 16C may further include a fixing portion disposed along at least the cover 11C on an outer periphery of the housing C surrounding the housing C by using a direction other than the X direction and the Y direction as an axis. In addition, the fixing member 16C may be directly fixed to the base 15C by, for example, an adhesive (not illustrated), a bolt (not illustrated), or a hook (not illustrated). In addition, the hooking portions 166 of the both end portions 164 and the both end portions 264 may be caught by and hooked on the recessed portions 15d of the base 15C by, for example, the hooking portions 166 being respectively disposed in the both end portions 164 and the both end portions 264 and the recessed portions 15d being respectively disposed at positions in the base 15C corresponding to the hooking portions 166.

Figure 14:
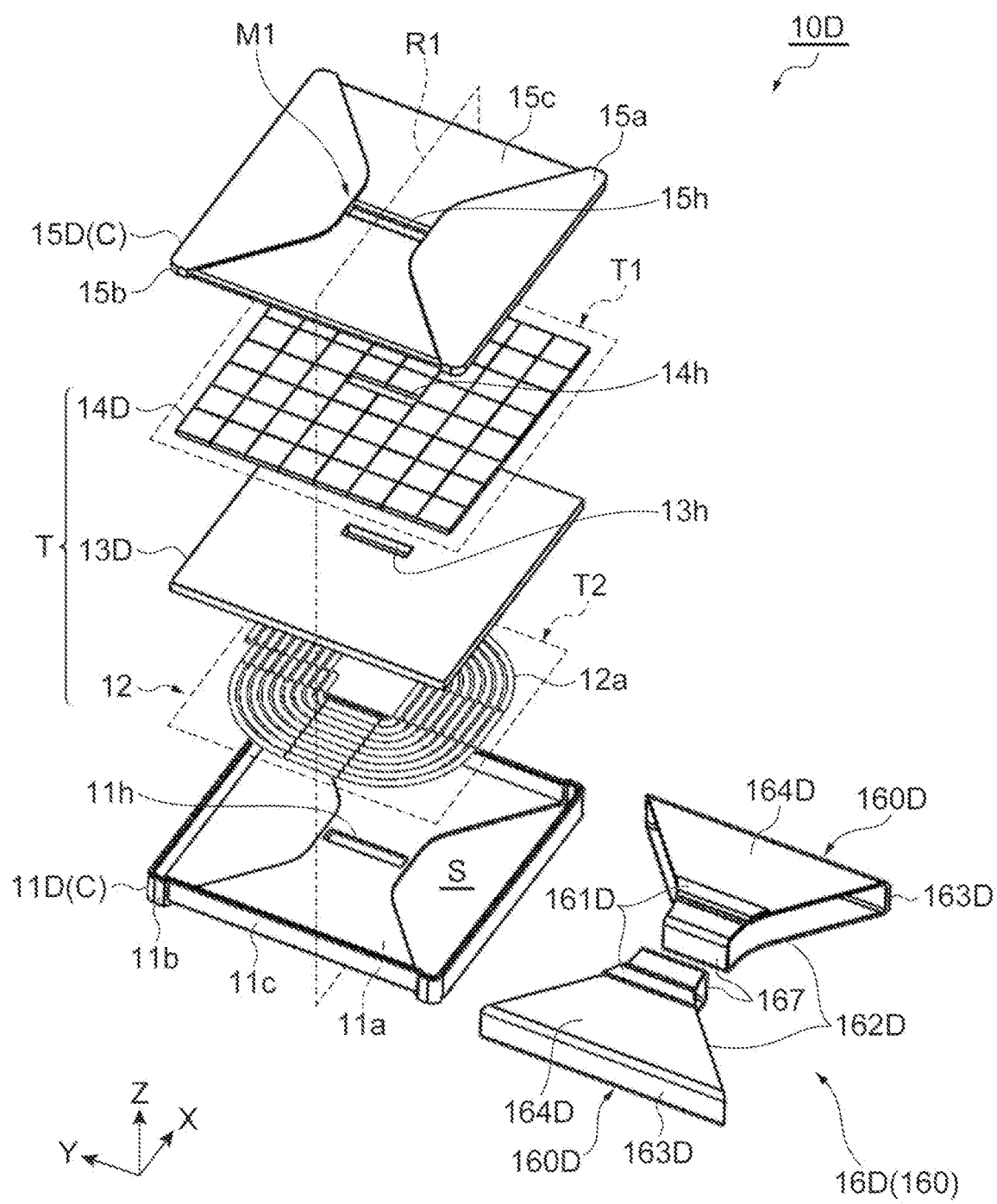
FIG. 14 is an exploded perspective view of a coil device according to a fifth embodiment.

A coil device 10D according to a fourth embodiment will be described with reference to FIGS. 14 to 16. The coil device 10D differs from the coil device 10B in that the coil device 10D is provided with a cover 11D including a through hole 11h instead of the cover 11B, a holding member 13D including a through hole 13h instead of the holding member 13, a ferrite portion 14D including a through hole 14h instead of the ferrite portion 14, a base 15D including a through hole 15h instead of the base 15B, and a fixing member 16D including a pair of first fixing portions 160D instead of the fixing member 16B.

The fixing member 16D includes the pair of first fixing portions 160D disposed across the through holes 11h, 13h, 14h, and 15h and fixing the cover 11D to the base 15D. The first fixing portion 160D is shaped by, for example, the fixing member 16B being divided into two in the X direction near the middle in the X direction and a pair of inner fixing portions 167 being disposed in the divided places.

In the cover 11D, the through hole 11h into which the pair of inner fixing portions 167 can be inserted is formed in the middle portion M2 of the cover 11D. In the holding member 13D, the through hole 13h into which the pair of inner fixing portions 167 can be inserted is formed in the middle portion of the holding member 13D. In the ferrite portion 14D, the through hole 14h into which the pair of inner fixing portions 167 can be inserted is formed in the middle portion of the ferrite portion 14D. In the base 15D, the through hole 15h into which the pair of inner fixing portions 167 can be inserted is formed in the middle portion M1 of the base 15D. Accordingly, the pair of inner fixing portions 167 inserted into the through holes 11h, 13h, 14h, and 15h interconnect the middle portion M2 of the cover 11D and the middle portion M1 of the base 15D on the first outer periphery R1. The through holes 11h, 13h, 14h, and 15h are, for example, long holes that are long in one direction along the XY plane (Y direction in the present embodiment).

Each of the pair of first fixing portions 160D is annularly formed by, for example, joining in a pair of joining portions 161D as is the case with the joining portion 161. The pair of first fixing portions 160D are disposed symmetrically to each other across the through holes 11h and 15h on the first outer periphery R1 in a state where the pair of inner fixing portions 167 are inserted into the through holes 11h, 13h, 14h, and 15h. Accordingly, the pair of first fixing portions 160D as a whole are disposed practically over the entire circumference of the first outer periphery R1. The fixing member 16D may be directly fixed to the base 15D by, for example, an adhesive (not illustrated), a bolt (not illustrated), or a hook (not illustrated).

The fixing member 16D as described above is in planar contact with the cover 11D in a pair of intermediate portions 162D and a pair of connecting portions 163D. The pair of intermediate portions 162D and the pair of connecting portions 163D disperse a load in the places of contact with the cover 11D. A pair of both end portions 164D transmit a load transmitted from the cover 11D to the base 15D in the places of contact with the cover 11D. Furthermore, the pair of inner fixing portions 167 transmit a load transmitted from the middle portion M2 of the cover 11D to the middle portion M1 of the base 15D by interconnecting the middle portion M2 of the cover 11D and the middle portion M1 of the base 15D. As a result, the tightening strength of the fixing member 16D is further dispersed.

Figure 16:
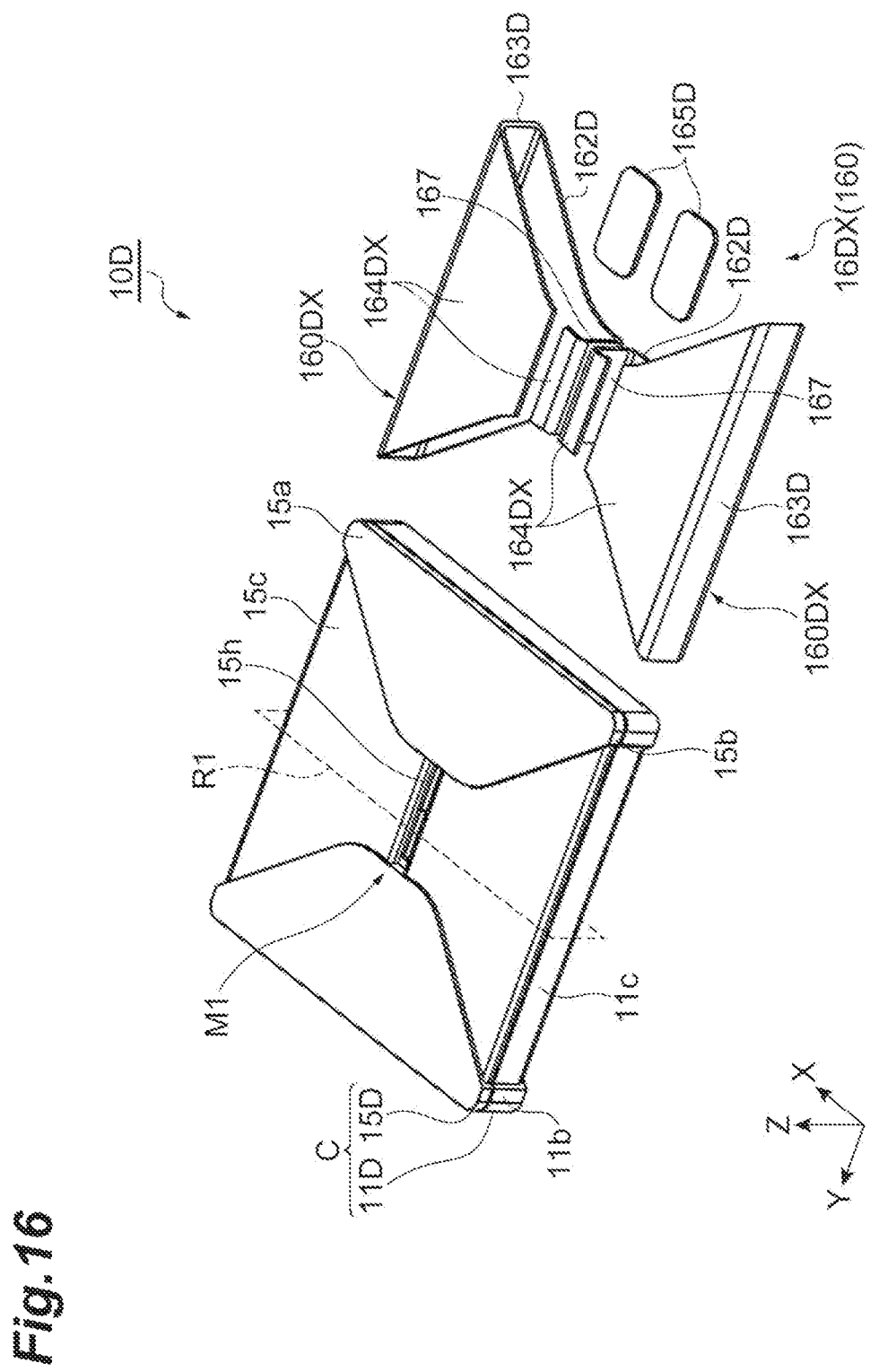
FIG. 16 is a diagram for describing a modification example of the fixing member.

As illustrated in FIG. 16, the fixing member 16D may be modified in the form of a fixing member 16DX including a pair of first fixing portions 160DX. In each of the first fixing portions 160DX, both end portions 164DX divided near the middle portion M1 of the base 15D are fixed via a holding tool 165D. Also in this case, the pair of intermediate portions 162D and the pair of connecting portions 163D disperse a load in the places of contact with the cover 11D. The pair of both end portions 164DX transmit a load transmitted from the cover 11D to the base 15D in the places of contact with the cover 11D. Furthermore, the pair of inner fixing portions 167 transmit a load transmitted from the middle portion M2 of the cover 11D to the middle portion M1 of the base 15D by interconnecting the middle portion M2 of the cover 11D and the middle portion M1 of the base 15D.

Figure 17:
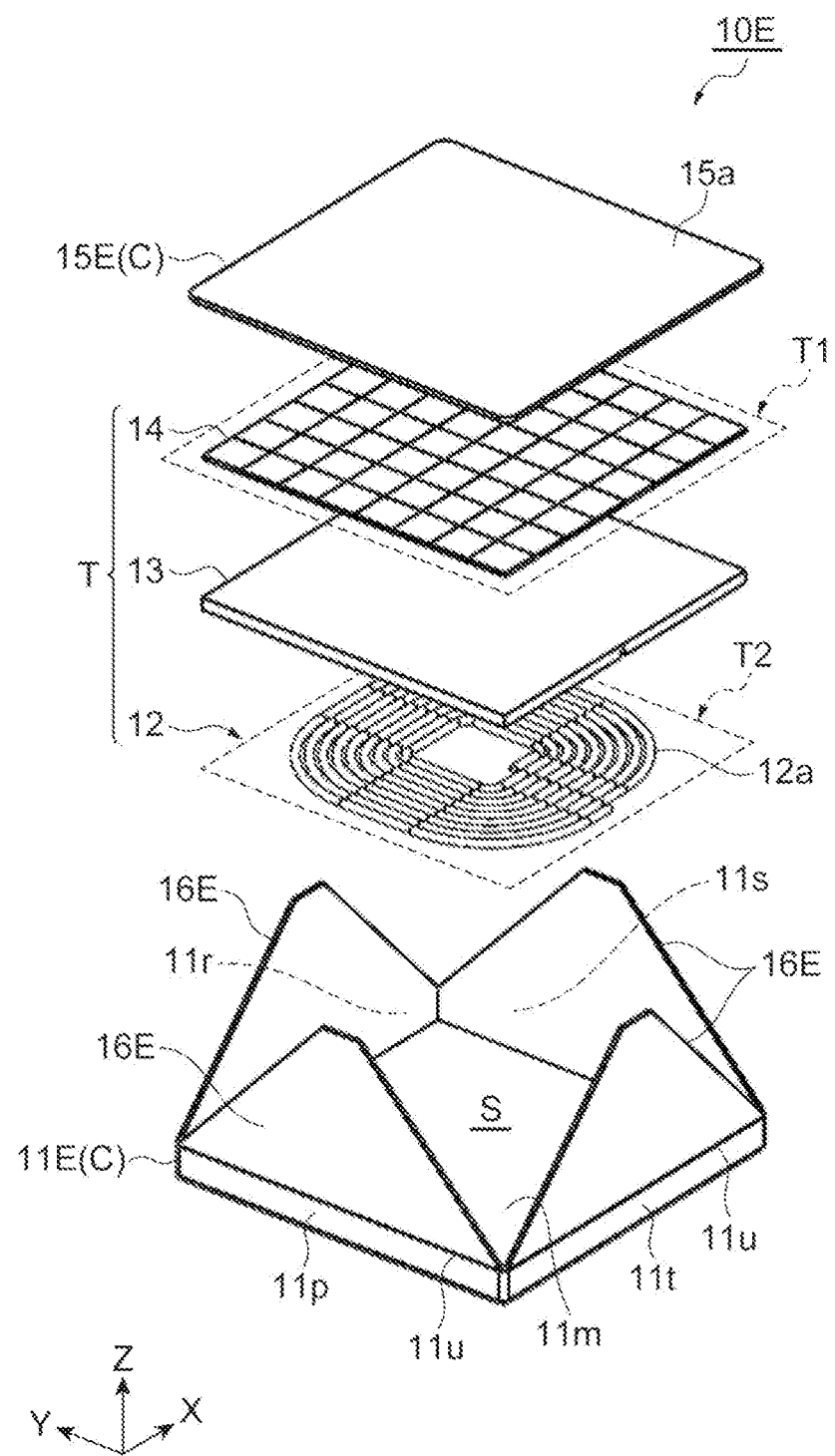
FIG. 17 is an exploded perspective view of a coil device according to a sixth embodiment.
Figure 18A:
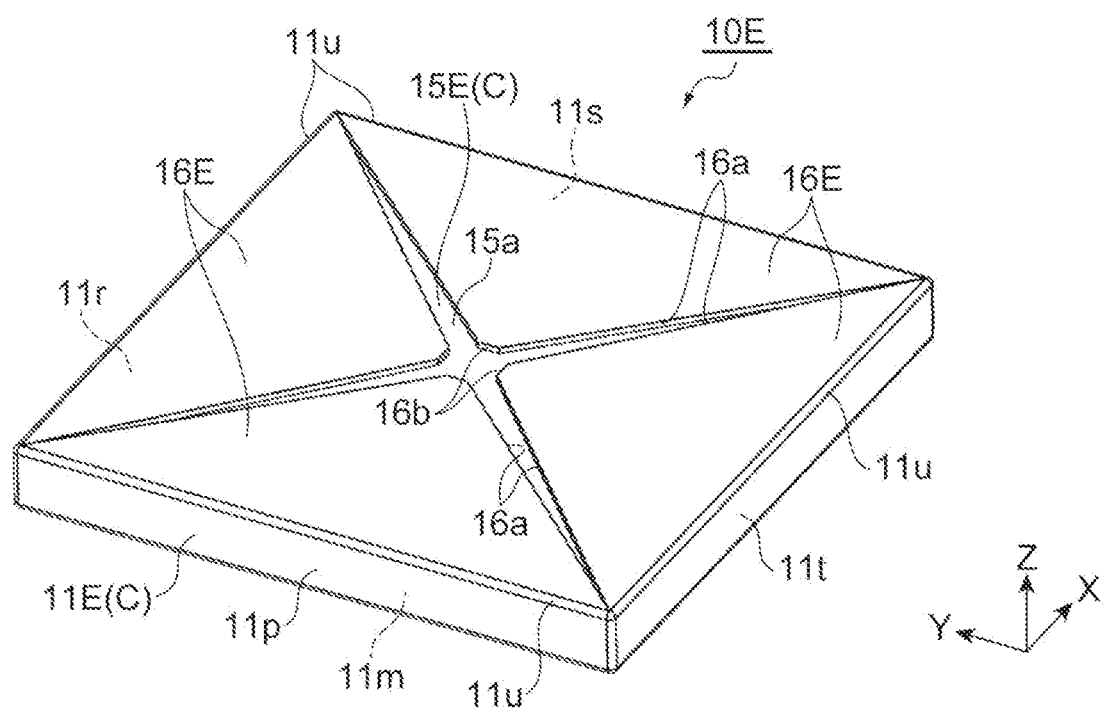
FIG. 18A is a perspective view of the coil device illustrated in FIG. 17.
Figure 18B:
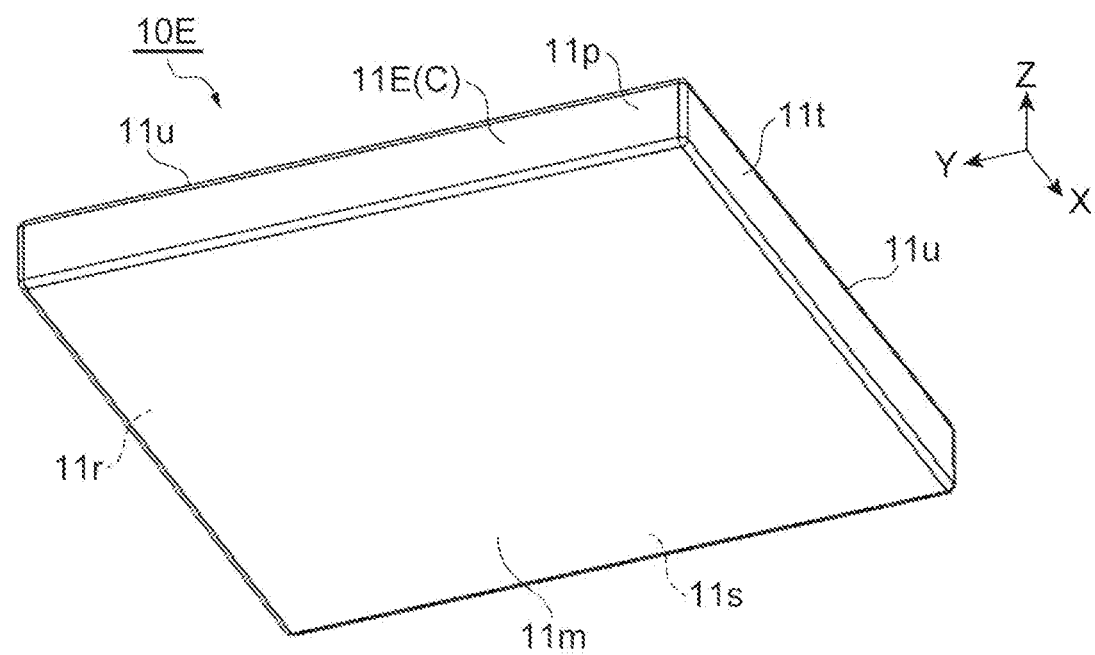
FIG. 18B is a perspective view of the coil device illustrated in FIG. 17.

A coil device 10E according to a fifth embodiment will be described with reference to FIGS. 17, 18A and 18B. The coil device 10E differs from the coil device 10 in that the coil device 10E is provided with a cover 11E where fixing portions 16E are integrally formed instead of the cover 11 and the fixing member 16 and a base 15E from which the groove portion 15c is omitted instead of the base 15.

The cover 11E has a box shape and includes a bottom surface 11m and side surfaces 11p, 11r, 11s, and 11t. The cover 11E includes the four fixing portions 16E disposed to extend from respective sides 11u of the side surfaces 11p, 11r, 11s, and 11t. The fixing portions 16E fix the cover 11E to the base 15E by being fixed on the plate portion 15a of the base 15E.

The cover 11E ensures the rigidity of the coil device 10E as a whole. The cover 11E is formed of a high-rigidity, non-magnetic, and electrically non-conductive material (such as high-strength polyethylene terephthalate (PET) resin and silicone rubber). The cover 11E has rigidity to the extent that a misalignment of the cover 11E with respect to the base 15E or deformation of the cover 11E can be suppressed when a load acting on the cover 11E is transmitted to the base 15E by the fixing portion 16E. Examples of the load acting on the cover 11E include a load for supporting interior parts such as the coil portion T and a load directly acting on the cover 11E from the outside of the coil device 10E. In a case where the coil device 10E is attached to the vehicle V such that the cover 11E is on the vertically lower side, for example, the cover 11E being deformed to hang vertically downward can be suppressed.

The fixing portions 16E are fixed on the plate portion 15a of the flat plate-shaped base 15E including the surface of the base 15E opposite to the coil portion T. The shape of each of the fixing portions 16E is, for example, similar to the triangle that is obtained by the bottom surface 11m being divided into four equal parts by a pair of diagonal lines. This triangle includes a pair of side portions 16a and a top portion 16b. In a state where each of the fixing portions 16E is fixed on the plate portion 15a, the side portions 16a are capable of extending along the side portions 16a of the adjacent fixing portions 16E such that the gap between the side portions 16a of the adjacent fixing portions 16E widens toward the top portions 16b of the fixing portions 16E. In a state where each of the fixing portions 16E is fixed on the plate portion 15a, the top portions 16b are capable of being disposed at a predetermined distance from the top portions 16b of the adjacent fixing portions 16E. The shape of the fixing portion 16E is not limited thereto, and the fixing portion 16E may have any shape insofar as the fixing portion 16E can be fixed on the plate portion 15a.

The accommodating space S is formed by the fixing portion 16E of the cover 11E being disposed along the plate portion 15a of the base 15E. The cover 11E accommodates the coil portion T such that the coil portion T as a whole is enclosed along with the base 15E. At this time, the fixing portion 16E has a strength retention function for the coil device 10E and a function as an exterior cover. Accordingly, the cover 11E and the base 15E are the housing C accommodating the coil portion T in the accommodating space S formed by the cover 11E and the base 15E.

The cover 11E is fixed to the base 15E by the fixing portion 16E as described above being fixed on the plate portion 15a of the base 15E. A load acting on the cover 11E is dispersed in the box-shaped cover 11E as a whole and transmitted to the base 15E via the fixing portion 16E.

In the coil device 10 to 10D described above, the fixing member 16 to 16D fixing the cover 11 to 11D to the base 15 to 15D includes the first fixing portion 160 disposed along at least the cover 11 to 11D on the first outer periphery R1 of the housing C. This fixing member 16 to 16D is in linear or planar contact with the cover 11 to 11D. As a result, when a load acting on the cover 11 to 11D is transmitted to the base 15 to 15D by the fixing member 16 to 16D, the load in the places of contact of the cover 11 to 11D with the fixing member 16 to 16D is dispersed. Accordingly, load concentration in the cover 11 to 11D can be suppressed even if, for example, the load of the coil portion T acts on the cover 11 to 11D.

In the coil device 10 to 10D, the fixing member 16 to 16D has a belt shape. As a result, the fixing member 16 to 16D is in planar contact with the cover 11 to 11D, and thus the load in the portion of contact between the fixing member 16 to 16D and the cover 11 to 11D is easily dispersed.

In the coil device 10B and 10D, the width of the fixing member 16B and 16D in the middle portions M1 and M2 of the housing C facing the first surface T1 and the second surface T2 of the coil portion T is smaller than the width of the fixing member 16B and 16D in the side portion 11b and the side portion 15b as the side surface portions of the housing C. As a result, the fixing member 16B and 16D covers a wide range of the side portion 11b and the side portion 15b of the housing C, and thus the cover 11B and 11D can be reliably fixed to the base 15B and 15D.

In the coil device 10 to 10D, the first outer periphery R1 passes through the middle portion M1 of the base 15 to 15D and the middle portion M2 of the cover 11 to 11D. As a result, the fixing member 16 to 16D is disposed to pass through at least one of the middle portion M1 of the base 15 to 15D and the middle portion M2 of the cover 11 to 11D on the first outer periphery R1 of the housing C. Accordingly, a load acting on the cover 11 to 11D is easily transmitted to the base 15 to 15D.

In the coil device 10 and 10B to 10D, the fixing member 16 and 16B to 16D is disposed over the entire circumference of the first outer periphery R1 and includes the joining portion 161, 161B, 261, and 161D for joining the fixing member 16 and 16B to 16D, respectively, with each other. In this case, the fixing member 16 and 16B to 16D is disposed over the entire circumference of the first outer periphery R1 by the joining portion 161, 161B, 261, and 161D that join the fixing member 16 and 16B to 16D, respectively, with each other, and thus parts for joining the fixing member 16 and 16B to 16D, respectively, with each other can be omitted.

In the coil device 10A, the fixing member 16A includes the intermediate portion 162 along the bottom portion 11a of the cover 11 facing the second surface T2, the both end portions 164A along the plate portion 15a of the base 15 facing the first surface T1, and the connecting portions 163 interconnecting the intermediate portion 162 and the both end portions 164A, and the both end portions 164 of the fixing member 16A include the hooking portions 166 that can be hooked on the recessed portions 15d of the base 15A. As a result, the cover 11 can be easily fixed to the base 15A simply by the hooking portion 166 being hooked on the recessed portion 15d of the base 15A.

In the coil device 10C, the fixing member 16C further includes the second fixing portion 260 surrounding the cover 11C and the base 15C, extending along the second outer periphery R2 of the housing C crossing the first outer periphery R1, and disposed along at least the cover 11C. As a result, the cover 11C is fixed to the base 15C by the second fixing portion 260 as well as the first fixing portion 160. Accordingly, the cover 11C can be reliably fixed to the base 15C.

In the coil device 10D, the first fixing portion 160 includes the inner fixing portion 167 disposed to interconnect the middle portion M1 of the base 15D on the first outer periphery R1 and the middle portion M2 of the cover 11D on the first outer periphery R1. As a result, a load acting on the middle portion M2 of the cover 11D is easily transmitted to the middle portion M1 of the base 15D via the inner fixing portion 167.

In the coil device 10 to 10D, the housing C includes the groove portions 11c and 15c where the fixing member 16 to 16D is disposed. As a result, a misalignment of the fixing member 16 to 16D from the housing C can be suppressed.

In the coil device 10E, the cover 11E is fixed to the base 15E by the fixing portions 16E of the cover 11E being fixed on the plate portion 15a including the surface of the base 15E that is on the side opposite to the coil portion T. A load acting on the cover 11E is dispersed in the box-shaped cover 11E as a whole and transmitted to the base 15E via the fixing portion 16E. Accordingly, load concentration in the cover 11E can be suppressed even if, for example, the load of the coil portion T acts on the cover 11E.

Although several embodiments of the present disclosure have been described above, the present invention is not limited to the above-described embodiments.

Although the fixing member 16 is a belt-shaped member in the above-described embodiments, the fixing member 16 may be, for example, a wire rod instead. Also in this case, the fixing member 16 is in linear contact with the cover 11, and thus the load in the portion of contact between the fixing member 16 and the cover 11 is easily dispersed. Alternatively, the fixing member 16 may be configured by, for example, a plurality of wire rods being apposed in a direction crossing the first outer periphery R1. Also in this case, the fixing member 16 is practically in planar contact with the cover 11, and thus the load in the portion of contact between the fixing member 16 and the cover 11 is easily dispersed.

The coil 12 is a so-called circular coil. Alternatively, the coil 12 may be a solenoid-type coil in which the conductive wire 12a is wound around the axis.

In the above-described embodiments, the coil device 10 has been described based on the power reception coil device 6 attached to the vehicle V as an example. The coil device 10 can also be adopted for the power transmission coil device 5 installed on the road surface G Also in this case, the fixing member 16 is capable of suppressing a misalignment of the cover 11 with respect to the base 15 attributable to a load acting on the coil device 10. Examples of the load in this case include a load at a time when a tire of the vehicle V is in contact with the cover 11 of the power transmission coil device 5 (coil device 10) before or after stopping of the vehicle V traveling on the ground at a predetermined position.

Although the power reception coil device 6 used in the wireless power transfer system 1 for charging the battery 9 mounted in the vehicle V has been described as an example in the above-described embodiments, the present invention is not limited to this aspect. For example, the coil device 10 according to the present disclosure is also applicable to a coil device used in a wireless power transfer system for charging a battery of a movable object other than the vehicle such as an underwater vehicle. Alternatively, the coil device 10 according to the present disclosure may be applied to a coil device used in a system directly supplying power to power-consuming parts such as an electric motor and a sensor. Although a case where the coil device 10 according to the present disclosure is applied as the power reception coil device 6 of the wireless power transfer system 1 has been described in the above-described embodiments, the present invention is not limited to this example. For example, the coil device 10 according to the present disclosure may also be applied as a coil device of an induction heating system or an eddy current flaw detection system.

REFERENCE SIGNS LIST

5: power transmission coil device (coil device), 6: power reception coil device (coil device), 10, 10A, 10B, 10C, 10D, 10E: coil device, 11, 11B, 11C, 11D, 11E: cover, 11a: bottom portion (surface), 11b: side portion (side surface portion), 11c: groove portion, 12: coil, 15, 15A, 15B, 15C, 15D, 15E: base, 15a: plate portion (surface), 15b: side portion (side surface portion), 15c: groove portion, 16, 16A, 16B, 16C, 16D, 16X, 16BX, 16CX, 16DX: fixing member, 16E: fixing portion, 160, 160D, 160DX: first fixing portion, 161, 161B, 161D: joining portion, 162, 162B, 162D: intermediate portion, 163, 163B, 163D: connecting portion, 164, 164A, 164B, 164D, 164X, 164BX, 164DX: both end portions, 166: hooking portion, 167: inner fixing portion, 260: second fixing portion, 261: joining portion, 262: intermediate portion, 263: connecting portion, 264, 264X: both end portions, C: housing, M1: middle portion, M2: middle portion, R1: first outer periphery, R2: second outer periphery, S: accommodating space (internal space), T: coil portion, T1: first surface, T2: second surface.

The invention claimed is:

1. A coil device comprising:
a coil portion including at least a coil;
a housing including a base disposed on a side of a first surface of the coil portion and a cover disposed on a side of a second surface of the coil portion and accommodating the coil portion in an internal space formed by the base and the cover; and
a fixing member fixing the cover to the base,
wherein the fixing member includes a first fixing portion disposed along at least the cover on a first outer periphery of the housing surrounding the base and the cover,
wherein the fixing member has a belt shape, and
wherein a width of the fixing member in a middle portion of the housing facing the first surface and the second surface of the coil portion is smaller than the width of the fixing member in a side surface portion of the housing.

2. The coil device according to claim 1, wherein the first outer periphery passes through a middle portion of the base and a middle portion of the cover.

3. The coil device according to claim 1, wherein the fixing member includes an intermediate portion along a surface of the cover facing the second surface, both end portions along a surface of the base facing the first surface, and connecting portions interconnecting the intermediate portion and each of the both end portions, and
the both end portions include hooking portions that can be hooked on the base.

4. The coil device according to claim 1, wherein the housing includes a groove portion where the fixing member is disposed.

5. A coil device comprising:
a coil portion including at least a coil;
a housing including a base disposed on a side of a first surface of the coil portion and a cover disposed on a side of a second surface of the coil portion and accommodating the coil portion in an internal space formed by the base and the cover; and a fixing member fixing the cover to the base, wherein the fixing member includes a first fixing portion disposed along at least the cover on a first outer periphery of the housing surrounding the base and the cover, and wherein the fixing member is disposed over an entire circumference of the first outer periphery and includes a joining portion that joins the fixing member with each other.

6. The coil device according to claim 5, wherein the fixing member has a belt shape.

7. The coil device according to claim 5, wherein the first outer periphery passes through a middle portion of the base and a middle portion of the cover.

8. The coil device according to claim 5, wherein the housing includes a groove portion where the fixing member is disposed.

9. The coil device according to claim 6, wherein the housing includes a groove portion where the fixing member is disposed.

10. A coil device comprising:

a coil portion including at least a coil;

a housing including abase disposed on a side of a first surface of the coil portion and a cover disposed on a side of a second surface of the coil portion and accommodating the coil portion in an internal space formed by the base and the cover; and a fixing member fixing the cover to the base, wherein the fixing member includes a first fixing portion disposed along at least the cover on a first outer periphery of the housing surrounding the base and the cover, and wherein the fixing member further includes a second fixing portion extending along a second outer periphery of the housing surrounding the base and the cover and crossing the first outer periphery, and disposed along at least the cover.

11. The coil device according to claim 10, wherein the fixing member has a belt shape.

12. The coil device according to claim 10, wherein the first outer periphery passes through a middle portion of the base and a middle portion of the cover.

13. The coil device according to claim 10, wherein the fixing member includes an intermediate portion along a surface of the cover facing the second surface, both end portions along a surface of the base facing the first surface, and connecting portions interconnecting the intermediate portion and each of the both end portions, and the both end portions include hooking portions that can be hooked on the base.

14. The coil device according to claim 10, wherein the housing includes a groove portion where the fixing member is disposed.

15. A coil device comprising:

a coil portion including at least a coil;

a housingincluding a base disposed on a side of a first surface of the coil portion and a cover disposed on a side of a second surface of the coil portion and accommodating the coil portion in an internal space formed by the base and the cover; and a fixing member fixing the cover to the base, wherein the fixing member includes a first fixing portion disposed along at least the cover on a first outer periphery of the housing surrounding the base and the cover, wherein the first outer periphery passes through a middle portion of the base and a middle portion of the cover, and wherein the fixing member includes an inner fixing portion disposed to interconnect the middle portion of the base on the first outer periphery and the middle portion of the cover on the first outer periphery.

16. The coil device according to claim 15, wherein the fixing member has a belt shape.

17. The coil device according to claim 15, wherein the housing includes a groove portion where the fixing member is disposed.

18. A coil device comprising:

a coil portion including at least a coil; and a housing including a flat plate-shaped base disposed on a side of a first surface of the coil portion and a box-shaped cover disposed on a side of a second surface of the coil portion and accommodating the coil portion in an internal space formed by the base and the cover, wherein the cover includes a bottom surface, a plurality of side surfaces surrounding an entire circumference of a peripheral edge of the bottom surface, and a plurality of fixing portions, the fixing portions being disposed to extend from respective sides of the side surfaces and fixed on a surface of the base on a side opposite to the coil portion, and wherein the fixing portions fix the cover to the base by being fixed on the surface of the base.

* * * * *